US012381344B2

(12) United States Patent
Oh et al.

(10) Patent No.: US 12,381,344 B2
(45) Date of Patent: Aug. 5, 2025

(54) BOARD CONNECTOR

(71) Applicant: LS MTRON LTD., Anyang-si (KR)

(72) Inventors: Sang Jun Oh, Anyang-si (KR); In Duk Song, Anyang-si (KR); Seok Lee, Anyang-si Gyeonggi-do (KR); Hyun Joo Hwang, Anyang-si Gyeonggi-do (KR); Dong Wan Kim, Anyang-si Gyeonggi-do (KR)

(73) Assignee: LS MTRON LTD., Anyang-si (KR)

( * ) Notice: Subject to any disclaimer, the term of this patent is extended or adjusted under 35 U.S.C. 154(b) by 357 days.

(21) Appl. No.: 17/909,651

(22) PCT Filed: Feb. 5, 2021

(86) PCT No.: PCT/KR2021/001542

§ 371 (c)(1),
(2) Date: Sep. 6, 2022

(87) PCT Pub. No.: WO2021/177609

PCT Pub. Date: Sep. 10, 2021

(65) Prior Publication Data

US 2023/0104947 A1 Apr. 6, 2023

(30) Foreign Application Priority Data

Mar. 6, 2020 (KR) ........................ 10-2020-0028361
Feb. 1, 2021 (KR) ........................ 10-2021-0014158

(51) Int. Cl.
*H01R 12/71* (2011.01)
*H01R 12/70* (2011.01)
(Continued)

(52) U.S. Cl.
CPC ....... *H01R 12/716* (2013.01); *H01R 12/7005* (2013.01); *H01R 13/40* (2013.01); *H01R 13/6591* (2013.01)

(58) Field of Classification Search
CPC .. H01R 12/712; H01R 13/6581; H01R 12/73; H01R 12/716; H01R 12/7005; H01R 13/40; H01R 13/6591
See application file for complete search history.

(56) References Cited

U.S. PATENT DOCUMENTS 6,299,487 B1 * 10/2001 Lopata .................. H01R 24/60 439/607.5
6,368,154 B1 4/2002 Hirata et al.
2011/0189886 A1 * 8/2011 Chen ........................ H04Q 1/13 439/488

FOREIGN PATENT DOCUMENTS

CN 106410460 A 2/2017
CN 206878201 U 1/2018
(Continued)

OTHER PUBLICATIONS

Notice of Allowance for related Japanese Application No. 2022-553159; action dated Feb. 2, 2024; (3 pages).
(Continued)

*Primary Examiner* — Jean F Duverne
(74) *Attorney, Agent, or Firm* — K&L Gates LLP

(57) ABSTRACT

The present disclosure pertains to a board connector comprising a plurality of RF contacts; an insulating part; a plurality of transmission contacts coupled to the insulating part between a first RF contact and a second RF contact, such that the RF contacts are spaced from each other in a first axial direction; and a ground housing to which the insulating part is coupled, the ground housing comprising a ground inner wall, a ground outer wall, and a ground connection wall coupled to each of the ground inner and outer walls, wherein the ground inner and outer walls are double-shielding walls surrounding the side of an inner space, the RF contacts are located in the inner space surrounded by the double-shielding walls, and each of the ground inner and
(Continued)

outer walls contacts the ground housing of a counter connector inserted into the inner space.

18 Claims, 21 Drawing Sheets

(51) Int. Cl.

| | |
|---|---|
| ***H01R 13/40*** | (2006.01) |
| ***H01R 13/6591*** | (2011.01) |

(56) References Cited

FOREIGN PATENT DOCUMENTS

| | | | |
|---|---|---|---|
| JP | 2017033654 | A | 2/2017 |
| JP | 2019530164 | A | 10/2019 |
| KR | 20010007060 | A | 1/2001 |
| KR | 20100043273 | A | 4/2010 |
| KR | 20170015125 | A | 2/2017 |
| KR | 20170036529 | A | 4/2017 |
| WO | 2017196100 | A2 | 11/2017 |
| WO | 2018025873 | A1 | 2/2018 |
| WO | 2020040004 | A1 | 2/2020 |

OTHER PUBLICATIONS

International Search Report for related International Application No. PCT/KR2021/001542; action dated Sep. 10, 2022; (5 pages).

Written Opinion for related International Application No. CT/KR2021/001542; action dated Sep. 10, 2022; (12 bages).

Office Action for related Japanese Application No. 2022-553159; action dated Aug. 3, 2021; (6 pages).

Office Action for related Chinese Application No. 202180018706.9; action dated Apr. 11, 2025; (9 pages).

* cited by examiner

BOARD CONNECTOR

CROSS-REFERENCE TO RELATED APPLICATION

The present application is a National Stage of International Application No. PCT/KR2021/001542 filed on Feb. 5, 2021, which claims priority to and the benefit of Korean Utility Model Application No. 10-2020-0028361, filed on Mar. 6, 2020; and Korean Utility Model Application No. 10-2021-0014158, filed Feb. 1, 2021 the disclosures of which are incorporated herein by reference in their entirety.

FIELD

The present disclosure relates to a board connector installed in an electronic device for an electrical connection between boards.

BACKGROUND

Connectors are provided in various types of electronic devices for an electrical connection. For example, a connector is installed in an electronic device such as a mobile phone, a computer, a tablet personal computer (PC), or the like so that various types of parts installed in the electronic device can be electrically connected to each other.

Generally, a radio frequency (RF) connector and a board-to-board connector (hereinafter, referred to as a “board connector”) are provided inside a wireless communication device such as a smartphone, a tablet PC, or the like among electronic devices. The RF connector is to transmit RF signals. The board connector is to process digital signals of cameras and the like.

The RF connector and the board connector are mounted on a printed circuit board (PCB). Conventionally, there was a problem in that, since several board connectors and RF connectors are mounted together with a plurality of parts in a limited space of the PCB, a PCB mounting area is increased. Therefore, as smartphones are being miniaturizing, there is a need for a technique in which an RF connector and a board connector are integrated and are optimized with a small PCB mounting area.

FIG. 1 is a schematic perspective view of a board connector according to a related art.

Referring to FIG. 1, a board connector 100 according to the related art includes a first connector 110 and a second connector 120.

The first connector 110 is to be coupled to a first board (not illustrated). The first connector 110 may be electrically connected to the second connector 120 through a plurality of first contacts 111.

The second connector 120 is to be coupled to a second board (not illustrated). The second connector 120 may be electrically connected to the first connector 110 through a plurality of second contacts 121.

The board connector 100 according to the related art may electrically connect the first board and the second board to each other as the first contacts 111 and the second contacts 121 are connected to each other. Further, when some contacts of the first contacts 111 and the second contacts 121 are used as RF contacts for RF signal transmission, the board connector 100 according to the related art may be implemented such that RF signals are transmitted between the first board and the second board through the RF contacts.

Here, the board connector 100 according to the related art has the following problems.

First, in the board connector 100 according to the related art, in the case in which contacts, which are spaced apart from each other by a relatively close distance among the contacts 111 and 121, are used as the RF contacts, there is a problem in that signal transmission is not smoothly performed due to RF signal interference between the RF contacts 111', 111", 121', and 121".

Second, in the board connector 100 according to the related art, there is a problem in that, since an RF signal blocking part 112 is disposed at an outermost part of the board connector, radiation of the RF signals to the outside may be blocked, but the blocking between the RF signals is not performed.

Third, in the board connector 100 according to the related art, the RF contacts 111', 111", 121', and 121" respectively include mounting parts 111*a*', 111*a*", 121*a*', and 121*a*" disposed on the boards, and are disposed such that the mounting parts 111*a*', 111*a*", 121*a*', and 121*a*" are exposed to the outside. Accordingly, in the board connector 100 according to the related art, there is a problem in that the blocking of the mounting parts 111*a*', 111*a*", 121*a*', and 121*a*" is not performed.

SUMMARY

Therefore, the present disclosure is designed to solve the problems and is for providing a board connector capable of reducing a possibility of radio frequency (RF) signal interference between RF contacts.

Technical Solution

To solve the above problems, the present disclosure may include the following configurations.

A board connector according to the present disclosure may include a plurality of radio frequency (RF) contacts through which RF signals are transmitted; an insulating part configured to support the RF contacts; a plurality of transmission contacts, which are coupled to the insulating part between a first RF contact and a second RF contact among the RF contacts such that the first RF contact and the second RF contact, are spaced apart from each other in a first axial direction; and a ground housing to which the insulating part is coupled. The ground housing may include a ground inner wall facing the insulating part, a ground outer wall spaced apart from the ground inner wall, and a ground connection wall coupled to each of the ground inner wall and the ground outer wall. The ground inner wall and the ground outer wall may form a double block wall that surrounds sides of an inner space therebetween. The first RF contact and the second RF contact may be located in the inner space surrounded by the double block wall. Each of the ground inner wall and the ground outer wall may be connected to a ground housing of a counterpart connector inserted into the inner space.

A board connector according to the present disclosure may include a plurality of RF contacts through which RF signals are transmitted; an insulating part configured to support the RF contacts; a plurality of transmission contacts, which are coupled to the insulating part between a first RF contact and a second RF contact among the RF contacts such that the first RF contact and the second RF contact, are spaced apart from each other in a first axial direction; and a ground housing to which the insulating part is coupled. The ground housing may include a ground sidewall that surrounds sides of an inner space thereof, a ground bottom that protrudes from a lower end of the ground sidewall toward the inner space, and a ground arm that protrudes upward from the ground bottom. The first RF contact and the second RF contact may be located in the inner space which is surrounded by the ground sidewall and the ground bottom.

According to the present disclosure, the board connector may have the following effects.

The present disclosure can use a ground housing to realize a blocking function against signals, electromagnetic waves, etc. of RF contacts. Accordingly, the present disclosure can prevent electromagnetic waves generated at the RF contacts from interfering with signals of circuit parts located in the vicinity thereof in an electronic device, and may prevent electromagnetic waves generated at the circuit parts located in the vicinity thereof in the electronic device from interfering with RF signals transmitted by the RF contacts. Therefore, the present disclosure can use the ground housing to contribute to improving electromagnetic interference (EMI) blocking performance and electromagnetic compatibility (EMC) performance.

The present disclosure can be implemented such that all of the RF contacts including a portion mounted on a board are located inside the ground housing. Accordingly, the present disclosure can realize complete blocking by enhancing a blocking function against the RF contacts using the ground housing.

DETAILED DESCRIPTION

Hereinafter, embodiments of a board connector according to the present disclosure will be described in detail with reference to the accompanying drawings.

Figure 1:
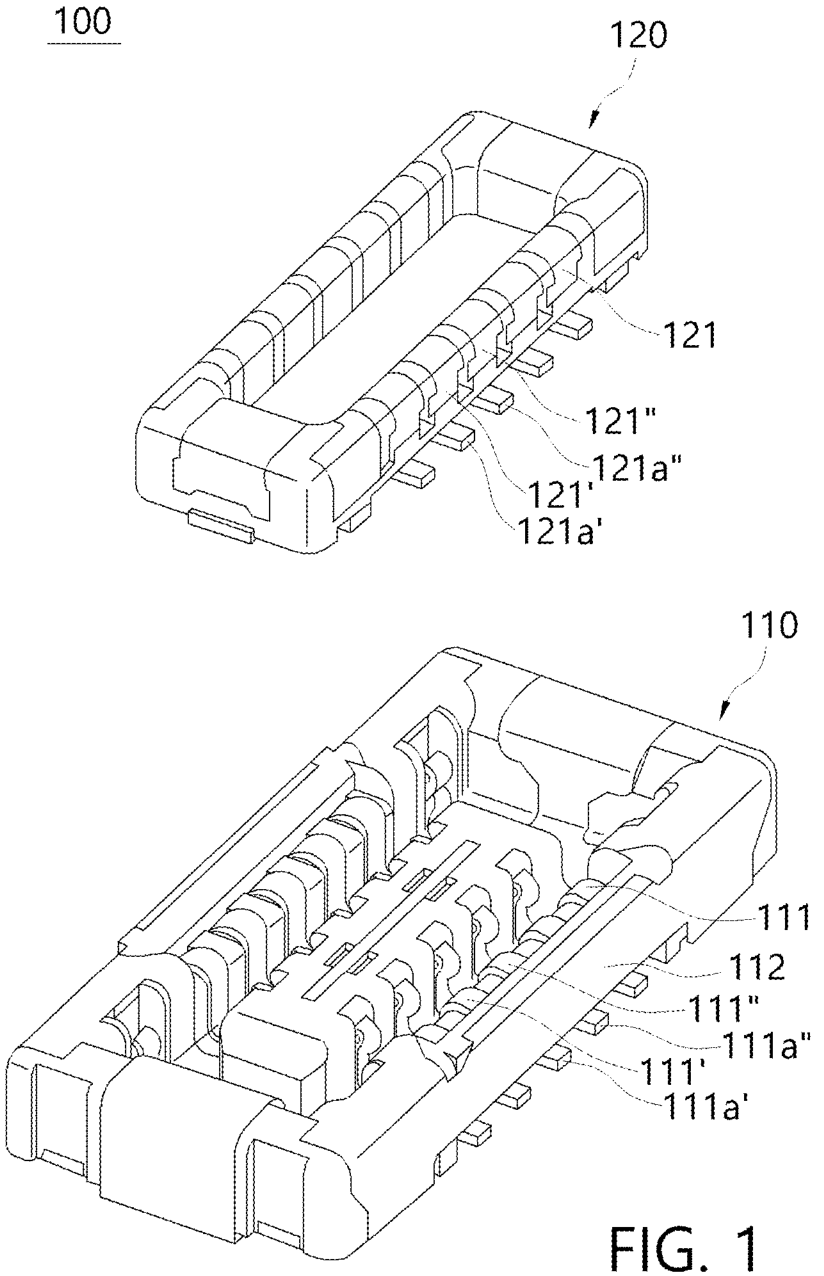
FIG. 1 is a schematic perspective view of a board connector according to a related art.
Figure 2:
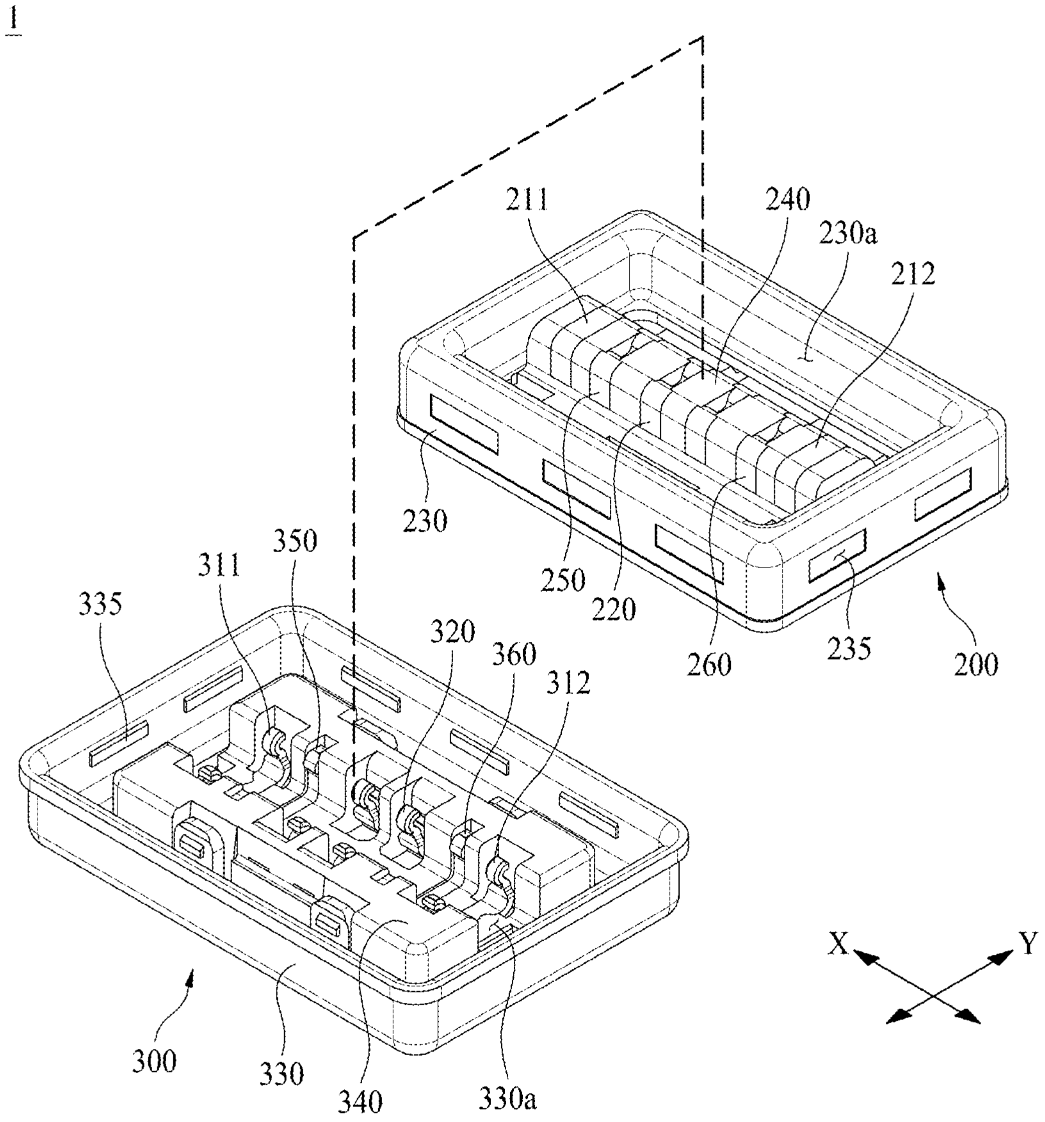
FIG. 2 is a schematic perspective view of a receptacle connector and a plug connector in a board connector according to the present disclosure.

Referring to FIG. 2, a board connector 1 according to the present disclosure may be installed in an electronic device (not illustrated) such as a mobile phone, a computer, a tablet personal computer, or the like. The board connector 1 according to the present disclosure may be used to electrically connect a plurality of boards (not illustrated). The boards may be printed circuit boards (PCBs). For example, when a first board and a second board are electrically connected, a receptacle connector mounted on the first board and a plug connector mounted on the second board may be connected to each other. Accordingly, the first board and the second board may be electrically connected to each other through the receptacle connector and the plug connector. Alternatively, a plug connector mounted on the first board and a receptacle connector mounted on the second board may be connected to each other.

The board connector 1 according to the present disclosure may be implemented as the receptacle connector. The board connector 1 according to the present disclosure may be implemented as the plug connector. The board connector 1 according to the present disclosure may be implemented as a connector including both of the receptacle connector and the plug connector. Hereinafter, an embodiment in which the board connector 1 according to the present disclosure is implemented as the plug connector is defined as a board connector 200 according to the first embodiment, an embodiment in which the board connector 1 according to the present disclosure is implemented as the receptacle connector is defined as a board connector 300 according to the second embodiment, and the embodiments will be described in detail with reference to the accompanying drawings. Further, description will be made assuming an embodiment in which the board connector 200 according to the first embodiment is mounted on the first board and the board connector 300 according to the second embodiment is mounted on the second board. From the above, it will be apparent to those skilled in the art to derive an embodiment in which the board connector 1 according to the present disclosure includes both of the receptacle connector and the plug connector.

<Board Connector 200 According to First Embodiment>

Figure 3:
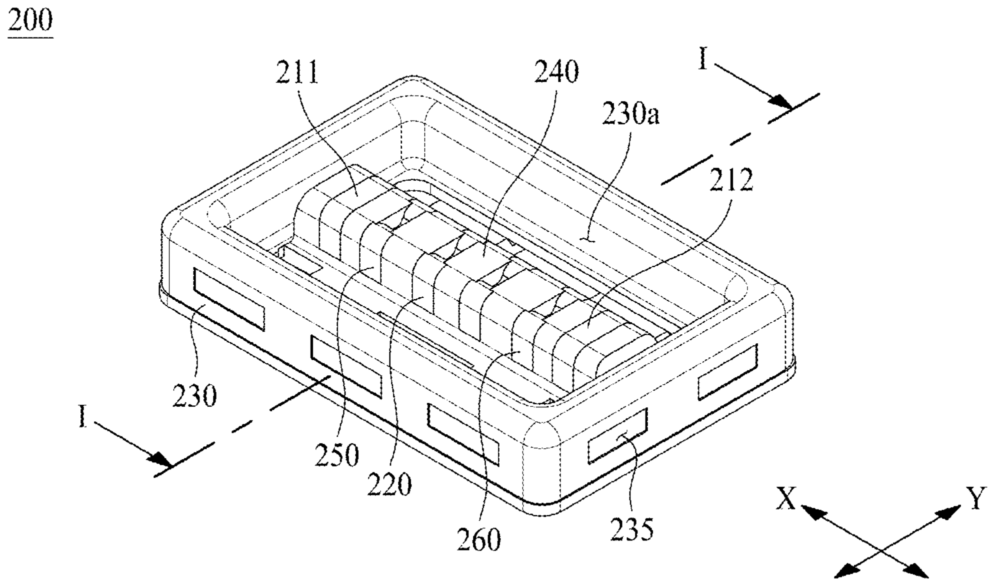
FIG. 3 is a schematic perspective view of a board connector according to a first embodiment.
Figure 4:
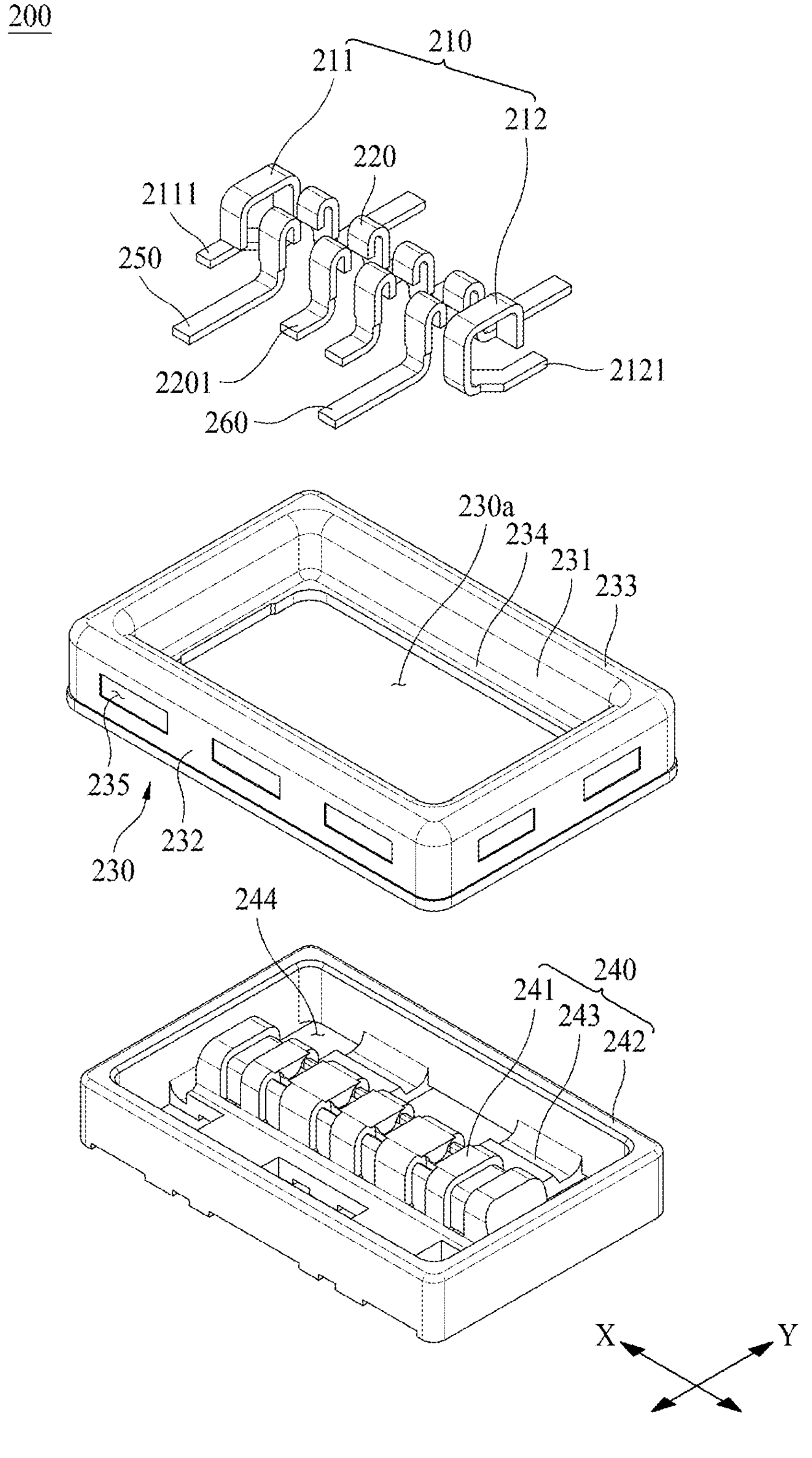
FIG. 4 is a schematic exploded perspective view of the board connector according to the first embodiment.

Referring to FIGS. 2 to 4, the board connector 200 according to the first embodiment may include a plurality of radio frequency (RF) contacts 210, a plurality of transmission contacts 220, a ground housing 230, and an insulating part 240.

The RF contacts 210 are to transmit RF signals. The RF contacts 210 may transmit ultra-high frequency RF signals. The RF contacts 210 may be supported by the insulating part 240. The RF contacts 210 may be coupled to the insulating part 240 through an assembly process. The RF contacts 210 and the insulating part 240 may be integrally molded through injection molding.

The RF contacts 210 may be disposed apart from each other. The RF contacts 210 may be mounted on the first board to be electrically connected to the first board. The RF contacts 210 may be connected to RF contacts of a counterpart connector to be electrically connected to the second board on which the counterpart connector is mounted. Accordingly, the first board and the second board may be electrically connected to each other. In the case in which the board connector 200 according to the first embodiment is a plug connector, the counterpart connector may be a receptacle connector. In the case in which the board connector 200 according to the first embodiment is a receptacle connector, the counterpart connector may be a plug connector.

Among the RF contacts 210, a first RF contact 211 and a second RF contact 212 may be spaced apart from each other in a first axial direction (X-axis direction). The first RF contact 211 and the second RF contact 212 may be supported by the insulating part 240 while being spaced apart from each other in the first axial direction (X-axis direction). In FIG. 4, the board connector 200 according to the first embodiment is illustrated as including two RF contacts 210, but the present disclosure is not limited thereto, and the board connector 200 according to the first embodiment may include three or more RF contacts 210. Meanwhile, in this specification, description will be made assuming a case in which the board connector 200 according to the first embodiment includes two RF contacts 210.

The first RF contact 211 may include a first RF mounting member 2111. The first RF mounting member 2111 may be mounted on the first board. Accordingly, the first RF contact 211 may be electrically connected to the first board through the first RF mounting member 2111. The first RF contact 211 may be formed of an electrically conductive material. For example, the first RF contact 211 may be formed of a metal. The first RF contact 211 may be connected to any one of RF contacts of the counterpart connector.

The second RF contact 212 may include a second RF mounting member 2121. The second RF mounting member 2121 may be mounted on the first board. Accordingly, the second RF contact 212 may be electrically connected to the first board through the second RF mounting member 2121. The second RF contact 212 may be formed of an electrically conductive material. For example, the second RF contact 212 may be formed of a metal. The second RF contact 212 may be connected to any one of the RF contacts of the counterpart connector.

Referring to FIGS. 2 to 4, the transmission contacts 220 are to be coupled to the insulating part 240. The transmission contacts 220 may function to transmit signals, data, and the like. The transmission contacts 220 may be coupled to the insulating part 240 through an assembly process. The transmission contacts 220 with the insulating part 240 may be integrally molded through injection molding.

The transmission contacts 220 may be disposed between the first RF contact 211 and the second RF contact 212 in the first axial direction (X-axis direction). Accordingly, the transmission contacts 220 may be disposed in a space in which the first RF contact 211 and the second RF contact 212 are spaced apart from each other in order to reduce RF signal interference between the first RF contact 211 and the second RF contact 212. Therefore, in the board connector 200 according to the first embodiment, by increasing a distance between the first RF contact 211 and the second RF contact 212, it is possible to reduce the RF signal interference, and by arranging the transmission contacts 220 in the space for the first RF contact 211 and the second RF contact 212, it is possible to improve space utilization of the insulating part 240.

The transmission contacts 220 may be disposed apart from each other. The transmission contacts 220 may be mounted on the first board to be electrically connected to the first board. In this case, a transmission mounting member 2201 of each of the transmission contacts 220 may be mounted on the first board. The transmission contacts 220 may be formed of an electrically conductive material. For example, the transmission contacts 220 may be formed of a metal. The transmission contacts 220 may be connected to transmission contacts of the counterpart connector to be electrically connected to the second board on which the counterpart connector is mounted. Accordingly, the first board and the second board may be electrically connected to each other.

Meanwhile, in FIG. 4, the board connector 200 according to the first embodiment is illustrated as including four transmission contacts 220, but the present disclosure is not limited thereto, and the board connector 200 according to the first embodiment may include five or more transmission contacts 220. The transmission contacts 220 may be spaced apart from each other in the first axial direction (X-axis direction) and a second axial direction (Y-axis direction). The first axial direction (X-axis direction) and the second axial direction (Y-axis direction) are perpendicular to each other.

Referring to FIGS. 2 to 6, the ground housing 230 is configured such that the insulating part 240 is coupled thereto. The ground housing 230 may be mounted on the first board and be grounded. Accordingly, the ground housing 230 may realize a blocking function against signals, electromagnetic waves, etc. of the RF contacts 210. In this case, the ground housing 230 may prevent electromagnetic waves generated at the RF contacts 210 from interfering with signals of circuit parts located in the vicinity thereof in the electronic device, and may prevent electromagnetic waves generated at the circuit parts located in the vicinity thereof in the electronic device from interfering with RF signals transmitted by the RF contacts 210. Accordingly, the board connector 200 according to the first embodiment may use the ground housing 230 to contribute to improving electromagnetic interference (EMI) blocking performance and electromagnetic compatibility (EMC) performance. The ground housing 230 may be formed of an electrically conductive material. For example, the ground housing 230 may be formed of a metal.

The ground housing 230 may be disposed to surround sides of an inner space 230*a*. A portion of the insulating part 240 may be located in the inner space 230*a*. All of the first RF contact 211, the second RF contact 212, and the transmission contacts 220 may be located in the inner space 230*a*. In this case, all of the first RF mounting member 2111, the second RF mounting member 2121, and the transmission mounting members 2201 may also be located in the inner space 230*a*. Therefore, the ground housing 230 may implement a blocking wall against both of the first RF contact 211 and the second RF contact 212, and thus may realize complete blocking by enhancing a blocking function against the first RF contact 211 and the second RF contact 212. The counterpart connector may be inserted into the inner space 230*a*.

The ground housing 230 may be disposed to surround all of the sides of the inner space 230*a*. The inner space 230*a* may be disposed inside the ground housing 230. When the ground housing 230 is entirely formed in a rectangular loop shape, the inner space 230*a* may be formed in a rectangular parallelepiped shape. In this case, the ground housing 230 may be disposed to surround four sides of the inner space 230*a*.

Referring to FIGS. 2 to 8, the ground housing 230 may be implemented to have a double block wall. To this end, the ground housing 230 may include a ground inner wall 231, a ground outer wall 232, and a ground connection wall 233.

The ground inner wall 231 faces the insulating part 240. The ground inner wall 231 may be disposed to face the inner space 230*a*. The ground inner wall 231 may be disposed to surround all of the sides of the inner space 230*a*. When the counterpart connector is inserted into the inner space 230*a*, the ground inner wall 231 may be connected to a ground housing of the counterpart connector.

The ground outer wall 232 is spaced apart from the ground inner wall 231. The ground outer wall 232 may be disposed outside the ground inner wall 231. The ground outer wall 232 may be disposed to surround all sides of the ground inner wall 231.

The ground outer wall 232 and the ground inner wall 231 may be implemented as a double block wall that surrounds the sides of the inner space 230*a*. The first RF contact 211 and the second RF contact 212 may be located in the inner space 230*a* surrounded by the double block wall. Accordingly, the ground housing 230 may use the double block wall to enhance a blocking function against the RF contacts 210. Therefore, the board connector 200 according to the first embodiment may contribute to further improving the EMI blocking performance and the EMC performance by using the double block wall.

The ground outer wall 232 may be mounted on the first board and be grounded. In this case, the ground housing 230 may be grounded through the ground outer wall 232. When one end of the ground outer wall 232 is coupled to the ground connection wall 233, the other end of the ground outer wall 232 may be mounted on the first board. In this case, the ground outer wall 232 may be formed to have a greater height than the ground inner wall 231.

Figure 8:
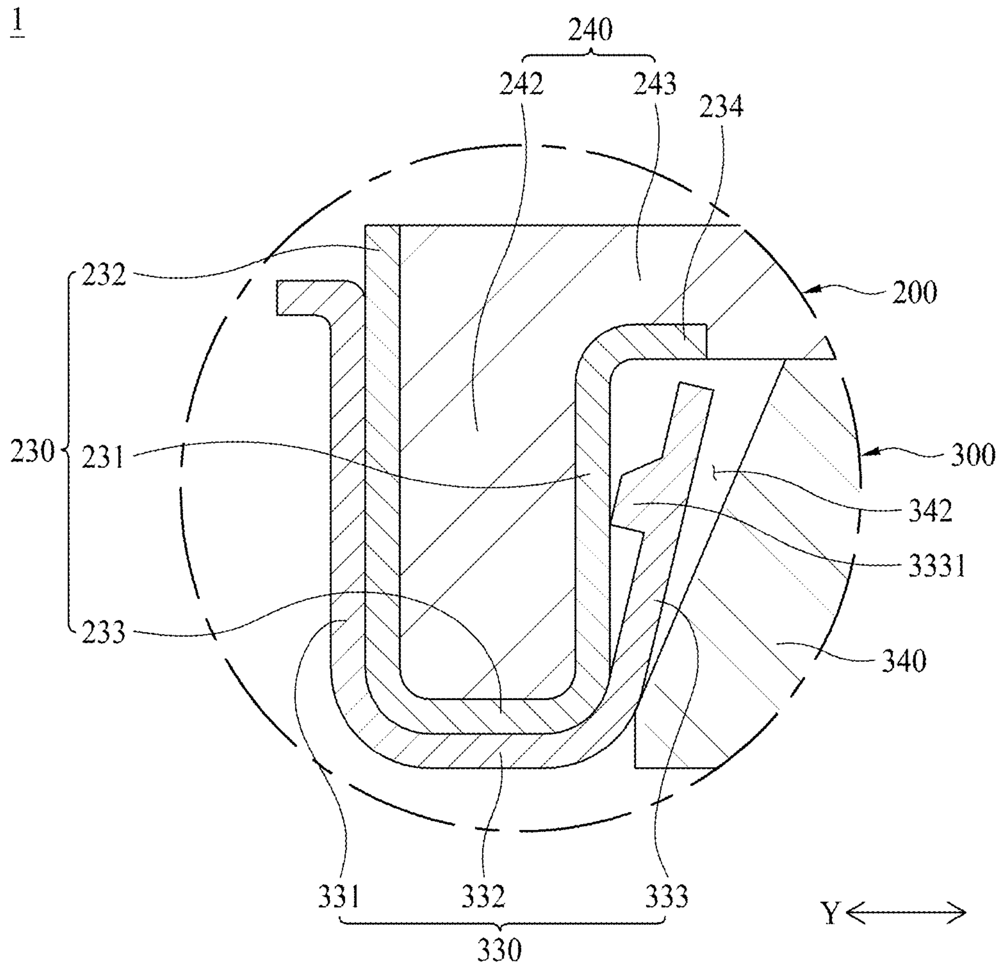
FIG. 8 is a schematic enlarged side cross-sectional view of portion A of FIG. 7 and illustrates a state in which the board connector according to the first embodiment and the board connector according to the second embodiment are coupled to each other.

Each of the ground outer wall 232 and the ground inner wall 231 may be connected to the ground housing of the counterpart connector inserted into the inner space 230*a*. For example, as illustrated in FIG. 8, the ground outer wall 232 and the ground inner wall 231 may be connected to a ground housing 330 of the counterpart connector. As described above, in the board connector 200 according to the first embodiment, since both of the ground outer wall 232 and the ground inner wall 231 are connected to the ground housing of the counterpart connector, a contact area between the ground housing 230 and the ground housing of the counterpart connector may be increased, and thus the blocking function may be further enhanced. Further, in the board connector 200 according to the first embodiment, the contact area between the ground housing 230 and the ground housing of the counterpart connector may be increased, and thus electrical adverse effects such as crosstalk and the like that may be caused by capacitance or induction between adjacent terminals may be reduced. In this case, in the board connector 200 according to the first embodiment, a path through which electromagnetic waves are introduced into at least one of grounds of the first board and the second board may be secured, and thus the EMI blocking performance may be further enhanced.

The ground connection wall 233 is to be coupled to each of the ground inner wall 231 and the ground outer wall 232. The ground connection wall 233 may be disposed between the ground inner wall 231 and the ground outer wall 232. The ground inner wall 231 and the ground outer wall 232 may be electrically connected to each other through the ground connection wall 233. Accordingly, when the ground outer wall 232 is mounted on the first board and grounded, the ground connection wall 233 and the ground inner wall 231 are also grounded, and thus the blocking function can be realized. When the counterpart connector is inserted into the inner space 230*a*, the ground connection wall 233 may be connected to the ground housing of the counterpart connector.

Figure 6:
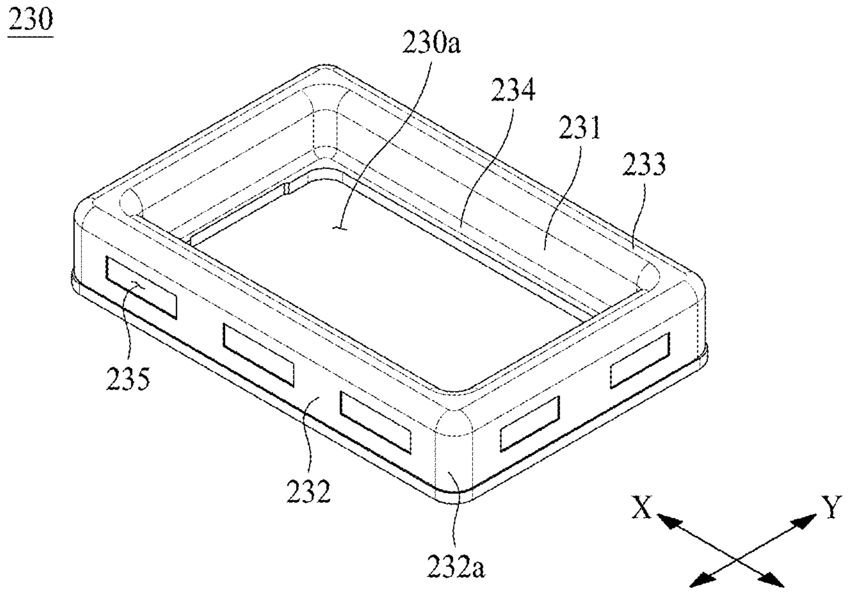
FIG. 6 is a schematic perspective view of a ground housing of the board connector according to the first embodiment.
Figure 7:
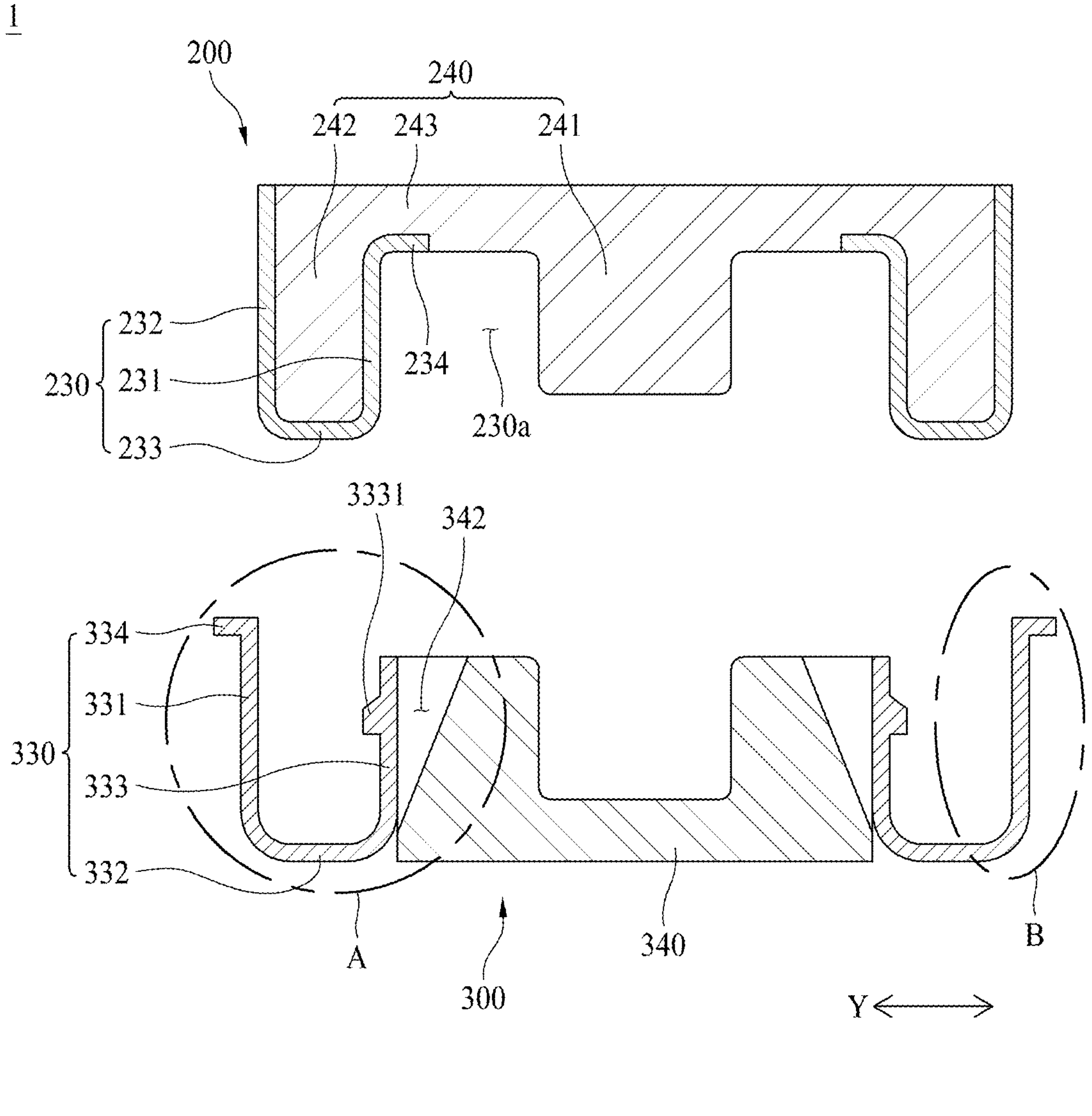
FIG. 7 is a schematic side cross-sectional view along line I-I of FIG. 3 and illustrates a state before the board connector according to the first embodiment and a board connector according to a second embodiment are coupled to each other.

The ground connection wall 233 may be coupled to each of one end of the ground outer wall 232 and one end of the ground inner wall 231. Referring to FIG. 6, one end of the ground outer wall 232 may correspond to an upper end of the ground outer wall 232, and one end of the ground inner wall 231 may correspond to an upper end of the ground inner wall 231. The ground connection wall 233 may be formed in a plate shape disposed in a horizontal direction, and each of the ground outer wall 232 and the ground inner wall 231 may be formed in a plate shape disposed in a vertical direction. The ground connection wall 233, the ground outer wall 232, and the ground inner wall 231 may be integrally formed.

The ground connection wall 233 may be connected to the ground housing of the counterpart connector inserted into the inner space 230*a*. Accordingly, in the board connector 200 according to the first embodiment, since all of the ground outer wall 232, the ground inner wall 231, and the ground connection wall 233 are connected to the ground housing of the counterpart connector, the contact area between the ground housing 230 and the ground housing of the counterpart connector may be increased, and thus the blocking function may be further enhanced.

The ground housing 230 may include a ground bottom 234.

The ground bottom 234 is configured to protrude from the ground inner wall 231 toward the inner space 230*a*. The ground bottom 234 may protrude from the other end of the ground inner wall 231 toward the inner space 230*a*. Referring to FIG. 6, the other end of the ground inner wall 231 may correspond to a lower end of the ground inner wall 231. In the board connector 200 according to the first embodiment, since the blocking function can be realized even for a bottom side of the ground housing 230 using the ground bottom 234, the blocking function against the first RF contact 211 and the second RF contact 212 may be further enhanced. When the counterpart connector is inserted into the inner space 230*a*, the ground bottom 234 may be connected to the ground housing of the counterpart connector. Accordingly, in the board connector 200 according to the first embodiment, the contact area may be increased through the connection between the ground bottom 234 and the ground housing of the counterpart connector, and thus the blocking function may be further enhanced. The ground bottom 234 may be formed in a plate shape disposed in the horizontal direction.

The ground bottom 234, the ground connection wall 233, the ground outer wall 232, and the ground inner wall 231 may be integrally formed. In this case, the ground housing

230 may be formed as one body without a seam. The ground housing 230 may be formed as one body without a seam by a metal injection method such as a metal die casting method, a metal injection molding (MIM) method, or the like. The ground housing 230 may be formed as one body without a seam by computer numerical control (CNC) machining, machining center tool (MCT) machining, or the like.

Referring to FIGS. 2 to 12, the ground housing 230 may include the following configurations in order to enhance the blocking function by improving contact between the ground inner wall 231 and the ground housing of the counterpart connector.

Figure 9:
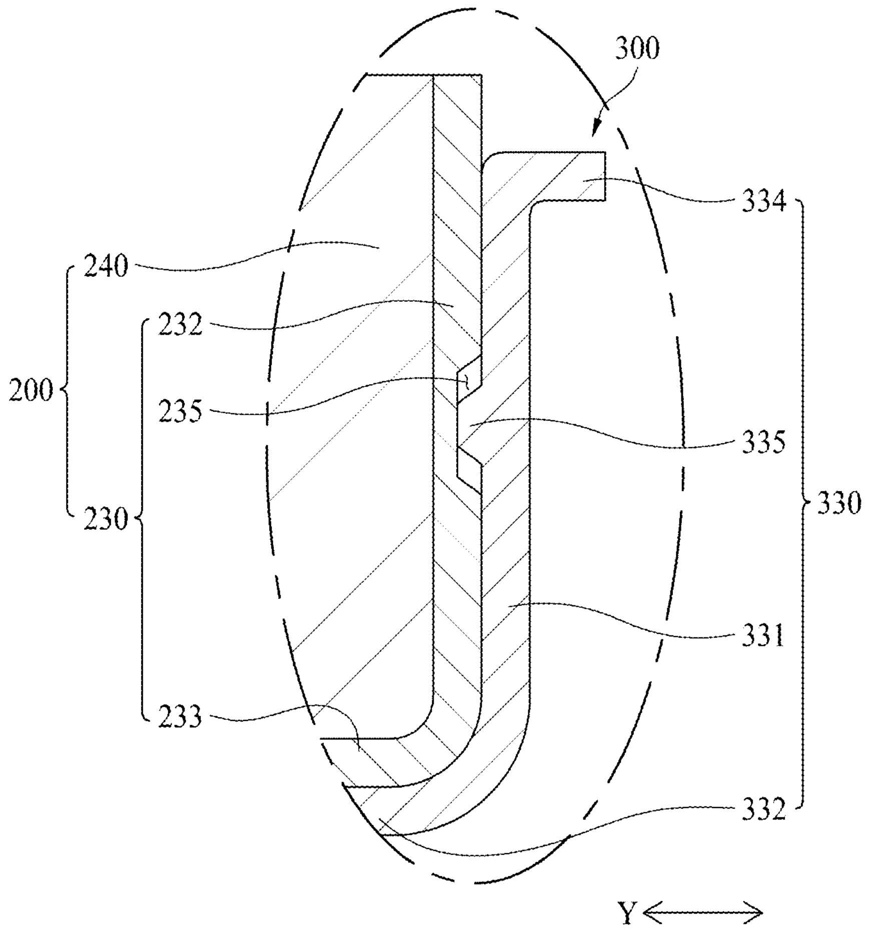
FIGS. 9 to 12 are schematic enlarged side cross-sectional views of portion B of FIG. 7 and illustrate a state in which the board connector according to the first embodiment and the board connector according to the second embodiment are coupled to each other.

First, as illustrated in FIG. 9, the ground housing 230 may include a connection groove 235. The connection groove 235 may be formed in an outer surface of the ground outer wall 232. The outer surface of the ground outer wall 232 is a surface facing a side opposite to the inner space 230*a*. The connection groove 235 may be implemented as a groove which is formed in the outer surface of the ground outer wall 232 to have a predetermined depth. The ground housing 330 of the counterpart connector may be inserted into the connection groove 235. In this case, a connection protrusion 335 of the ground housing 330 of the counterpart connector may be inserted into the connection groove 235. Accordingly, in the board connector 200 according to the first embodiment, contact between the ground housing 230 and the ground housing 330 of the counterpart connector may be improved using the connection groove 235, and thus the blocking function against the first RF contact 211 and the second RF contact 212 may be further enhanced. In FIG. 9, the connection groove 235 is illustrated as being formed to have a greater length than the connection protrusion 335 in the vertical direction, but the present disclosure is not limited thereto, and the connection groove 235 and the connection protrusion 335 may be formed to have substantially the same length. Meanwhile, the ground outer wall 232 may support the connection protrusion 335 inserted into the connection groove 235, and thus it is possible to prevent the connection protrusion 335 from being separated from the connection groove 235. The ground housing 230 may include a plurality of the connection grooves 235. In this case, the connection grooves 235 may be disposed apart from each other along the outer surface of the ground outer wall 232.

Figure 10:
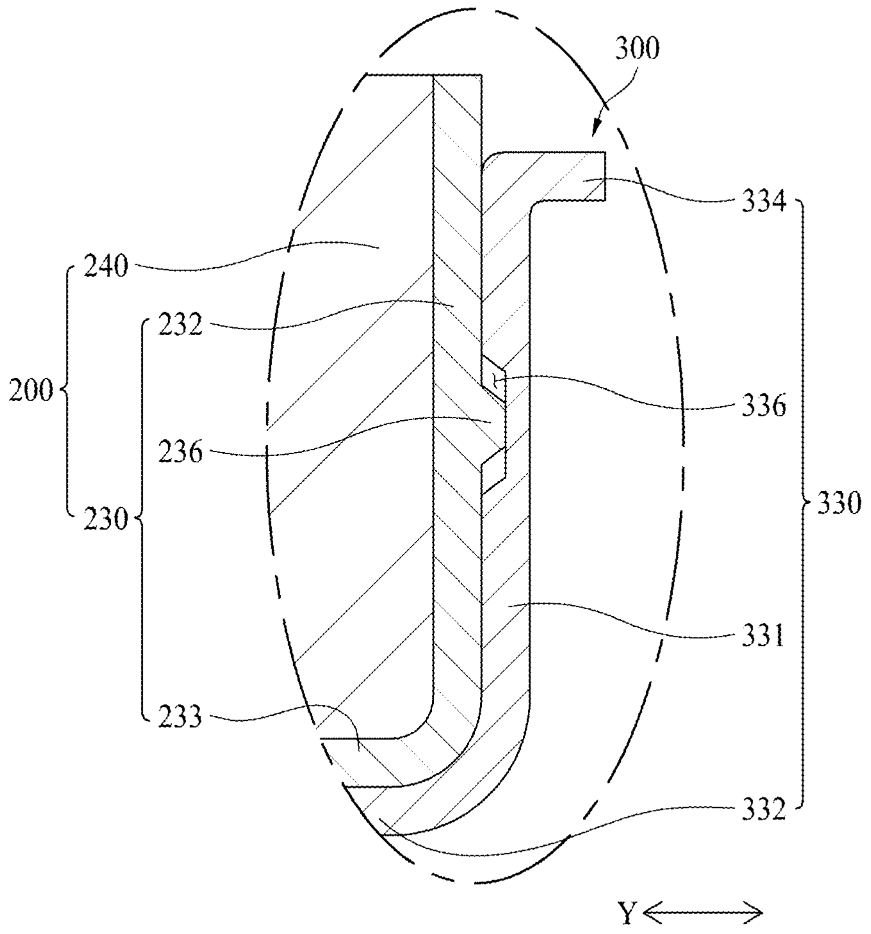

Next, as illustrated in FIG. 10, the ground housing 230 may include a connection protrusion 236. The connection protrusion 236 may be formed on the outer surface of the ground outer wall 232. The connection protrusion 236 may protrude from the outer surface of the ground outer wall 232. The connection protrusion 236 may be inserted into the ground housing 330 of the counterpart connector. In this case, the connection protrusion 236 may be inserted into a connection groove 336 of the ground housing 330 of the counterpart connector. Accordingly, in the board connector 200 according to the first embodiment, the contact between the ground housing 230 and the ground housing 330 of the counterpart connector may be improved using the connection protrusion 236, and thus the blocking function against the first RF contact 211 and the second RF contact 212 may be further enhanced. In FIG. 10, the connection protrusion 236 is illustrated as being formed to have a smaller length than the connection groove 336 in the vertical direction, but the present disclosure is not limited thereto, the connection protrusion 236 and the connection groove 336 may be formed to have substantially the same length. Meanwhile, the connection protrusion 236 may be inserted into the connection groove 336 and supported by the ground housing 330, and thus it is possible to prevent the connection protrusion 236 from being separated from the connection groove 336. The ground housing 230 may include a plurality of the connection protrusions 236. In this case, the connection protrusions 236 may be disposed apart from each other along the outer surface of the ground outer wall 232.

Figure 11:
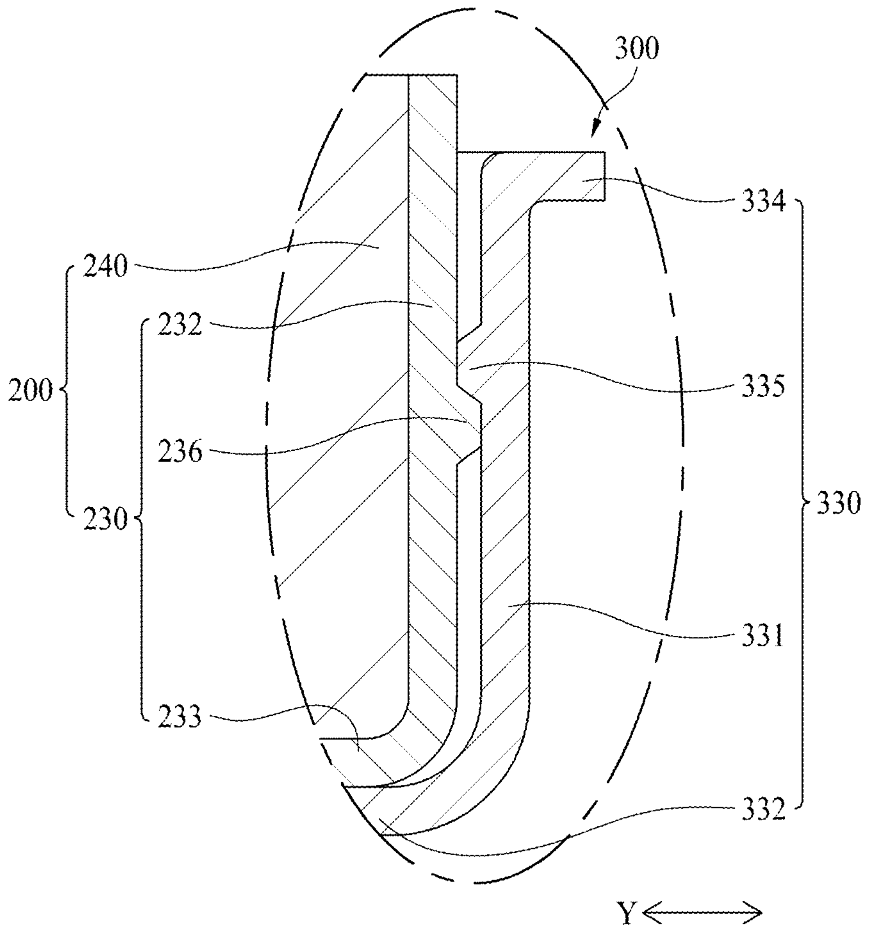

Next, as illustrated in FIG. 11, when the ground housing 230 includes the connection protrusion 236, the connection protrusion 236 may support the connection protrusion 335 of the ground housing 330 of the counterpart connector. Accordingly, in the board connector 200 according to the first embodiment, the contact between the ground housing 230 and the ground housing 330 of the counterpart connector may be improved using the connection protrusion 236, and thus the blocking function against the first RF contact 211 and the second RF contact 212 may be further enhanced. Meanwhile, the connection protrusion 236 may be disposed below the connection protrusion 335 and supported by the connection protrusion 335, and thus it is possible to prevent the connection protrusion 236 from being separated from the connection protrusion 335.

Figure 12:
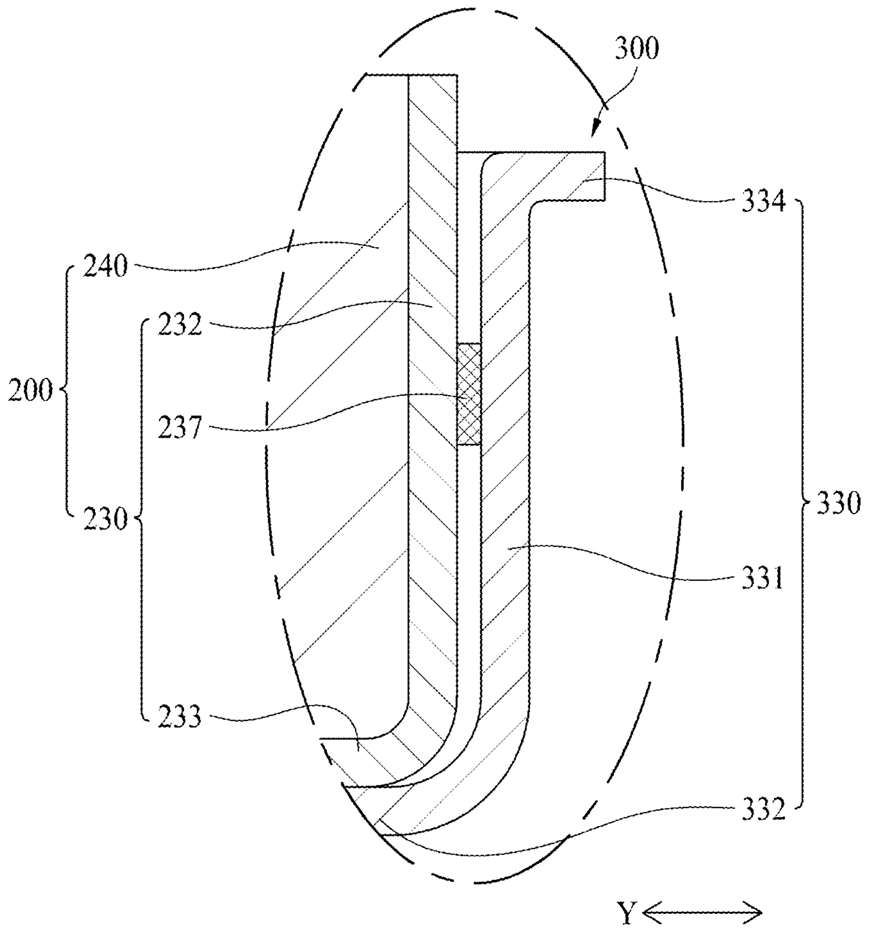

Next, as illustrated in FIG. 8, the ground housing 230 may be in contact with the ground housing 330 of the counterpart connector through surface contact between the outer surface of the ground outer wall 232 and the ground housing 330 of the counterpart connector. In this case, a gap may be generated between the outer surface of the ground outer wall 232 and the ground housing 330 of the counterpart connector, and in order to compensate for the gap, the ground housing 230 may include a conductive member 237, as illustrated in FIG. 12. The conductive member 237 may be coupled to the outer surface of the ground outer wall 232. The conductive member 237 may be formed in a closed loop shape so as to extend along the outer surface of the ground outer wall 232, including a corner portion 232*a* (illustrated in FIG. 6) of the outer surface of the ground outer wall 232. Accordingly, in the board connector 200 according to the first embodiment, the contact between the ground housing 230 and the ground housing 330 of the counterpart connector may be improved using the conductive member 237, and thus the blocking function against the first RF contact 211 and the second RF contact 212 may be further enhanced. Further, in the case of the embodiment in which the connection protrusion 236 and the connection groove 235 are used, it is difficult to implementing the embodiment (the connection protrusion 236 and the connection groove 235) in the corner portion 232*a* of the outer surface of the ground outer wall 232, whereas in the case of the embodiment in which the conductive member 237 is used, it is possible to improve ease of the operation of implementing the conductive member 237 in the corner portion 232*a* of the outer surface of the ground outer wall 232. The conductive member 237 may be formed of an electrically conductive material so as to electrically connect the ground outer wall 232 and the ground housing 330 of the counterpart connector. For example, the conductive member 237 may be formed of a metal. The conductive member 237 may be separately manufactured and then be coupled to the ground outer wall 232 by being mounted, attached, or fastened to the outer surface of the ground outer wall 232. The conductive member 237 may be coupled to the ground outer wall 232 by an electrically conductive blocking material being applied to the outer surface of the ground outer wall 232.

Referring to FIGS. 2 to 12, the insulating part 240 is to support the RF contacts 210. The RF contacts 210 and the transmission contacts 220 may be coupled to the insulating part 240. The insulating part 240 may be formed of an insulating material. The insulating part 240 may be coupled to the ground housing 230 such that the RF contacts 210 are located in the inner space 230*a*.

The insulating part 240 may include an insulating member 241.

The insulating member 241 is to support the RF contacts 210 and the transmission contacts 220. The insulating member 241 may be located in the inner space 230*a*. The insulating member 241 may be located inside the ground bottom 234. In this case, the ground bottom 234 may be located between the ground inner wall 231 and the insulating member 241. The ground bottom 234 may be disposed to surround an outer surface of the insulating member 241. The insulating member 241 may be inserted into an inner space of the counterpart connector.

The insulating part 240 may include an insertion member 242 and a connecting member 243.

The insertion member 242 is to be inserted into a gap between the ground inner wall 231 and the ground outer wall 232. The insertion member 242 is inserted into the gap between the ground inner wall 231 and the ground outer wall 232, and thus the insulating part 240 may be coupled to the ground housing 230. The insertion member 242 may be inserted into the gap between the ground inner wall 231 and the ground outer wall 232 in an interference fit manner. The insertion member 242 may be disposed on an outer side of the insulating member 241. The insertion member 242 may be disposed to surround the outer side of the insulating member 241.

The connecting member 243 is to be coupled to each of the insertion member 242 and the insulating member 241. The insertion member 242 and the insulating member 241 may be connected to each other through the connecting member 243. The connecting member 243 may be formed to have a smaller thickness than the insertion member 242 and the insulating member 241 in the vertical direction. Accordingly, a space may be generated between the insertion member 242 and the insulating member 241, and the counterpart connector may be inserted into the corresponding space. The connecting member 243 may be disposed to be in contact with the ground bottom 234. In this case, the ground bottom 234 may be disposed to cover the connecting member 243. The connecting member 243, the insertion member 242, and the connecting member 243 may be integrally formed.

Figure 5:
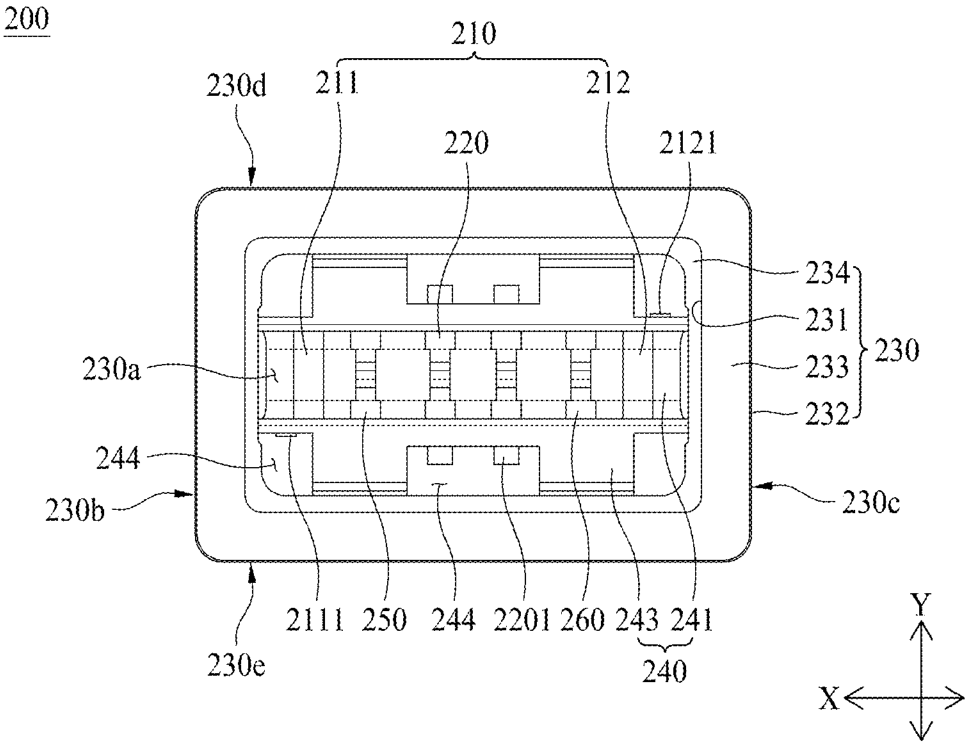
FIG. 5 is a schematic plan view of the board connector according to the first embodiment.

Referring to FIGS. 2 to 7, the insulating part 240 may include a soldering inspection window 244 (illustrated in FIG. 5).

The soldering inspection window 244 may be formed to pass through the insulating part 240. The soldering inspection window 244 may be used to check the state in which the first RF mounting member 2111 is mounted on the first board. In this case, the first RF contact 211 may be coupled to the insulating part 240 such that the first RF mounting member 2111 is located in the soldering inspection window 244. Accordingly, the first RF mounting member 2111 is not covered by the insulating part 240. Therefore, in the state in which the board connector 200 according to the first embodiment is mounted on the first board, an operator may check the state in which the first RF mounting member 2111 is mounted on the first board through the soldering inspection window 244. Accordingly, in the board connector 200 according to the first embodiment, even when the entire first RF contact 211, including the first RF mounting member 2111, is located inside the ground housing 230, it is possible to improve accuracy of a mounting operation of mounting the first RF contact 211 on the first board. The soldering inspection window 244 may be formed to pass through the insulating member 241.

The insulating part 240 may include a plurality of the soldering inspection windows 244. In this case, the second RF mounting member 2121 and the transmission mounting members 2201 may be located in the soldering inspection windows 244. Therefore, in the state in which the board connector 200 according to the first embodiment is mounted on the first board, the operator may check the state in which the first RF mounting member 2111, the second RF mounting member 2121, and the transmission mounting members 2201 are mounted on the first board through the soldering inspection windows 244. Accordingly, in the board connector 200 according to the first embodiment, it is possible to improve accuracy of a mounting operation of mounting the first RF contact 211, the second RF contact 212, and the transmission contacts 220 on the first board. The soldering inspection windows 244 may be formed to pass through the insulating part 240 while being spaced apart from each other.

Referring to FIGS. 2 to 7 and 13, the board connector 200 according to the first embodiment may include a first ground contact 250.

The first ground contact 250 is to be coupled to the insulating part 240. The first ground contact 250 may be mounted on the first board and be grounded. The first ground contact 250 may be coupled to the insulating part 240 through an assembly process. The first ground contact 250 may be integrally molded with the insulating part 240 through injection molding.

The first ground contact 250 may realize a blocking function against the first RF contact 211 together with the ground housing 230. In this case, the ground housing 230 may include a first double block wall 230*b*, a second double block wall 230*c*, a third double block wall 230*d*, and a fourth double block wall 230*e*, as illustrated in FIG. 5. Each of the first double block wall 230*b*, the second double block wall 230*c*, the third double block wall 230*d*, and the fourth double block wall 230*e* may be implemented by the ground inner wall 231, the ground outer wall 232, and the ground connection wall 233. The first double block wall 230*b* and the second double block wall 230*c* are disposed to face each other in the first axial direction (X-axis direction). The first RF contact 211 may be located between the first double block wall 230*b* and the second double block wall 230*c* in the first axial direction (X-axis direction). The first RF contact 211 may be located at a position where a distance from the first double block wall 230*b* is shorter than a distance from the second double block wall 230*c* in the first axial direction (X-axis direction). The third double block wall 230*d* and the fourth double block wall 230*e* are disposed to face each other in the second axial direction (Y-axis direction). The first RF contact 211 may be located between the third double block wall 230*d* and the fourth double block wall 230*e* in the second axial direction (Y-axis direction). The first RF contact 211 may be located apart from each of the third double block wall 230*d* and the fourth double block wall 230*e* in the second axial direction (Y-axis direction) by substantially the same distance.

The first ground contact 250 may be disposed between the first RF contact 211 and the transmission contacts 220 in the first axial direction (X-axis direction). Accordingly, the first RF contact 211 may be located between the first double block wall 230*b* and the first ground contact 250 in the first axial direction (X-axis direction), and may be located between the third double block wall 230*d* and the fourth double block wall 230*e* in the second axial direction (Y-axis direction). Therefore, in the board connector 200 according to the first embodiment, the blocking function against the first RF contact 211 may be enhanced using the first ground contact 250, the first double block wall 230*b*, the third double block wall 230*d*, and the fourth double block wall 230*e*.

The first ground contact 250, the first double block wall 230*b*, the third double block wall 230*d*, and the fourth double block wall 230*e* may be disposed on four sides of the first RF contact 211 to realize blocking power against the RF signals. In this case, the first ground contact 250, the first double block wall 230*b*, the third double block wall 230*d*, and the fourth double block wall 230*e* may implement a ground loop 250*a* (illustrated in FIG. 13) in the first RF contact 211. Therefore, in the board connector 200 according to the first embodiment, by further enhancing the blocking function against the first RF contact 211 using the ground loop 250*a*, complete blocking of the first RF contact 211 can be realized.

The first ground contact 250 may be formed of an electrically conductive material. For example, the first ground contact 250 may be formed of a metal. When the counterpart connector is inserted into the inner space 230*a*, the first ground contact 250 may be connected to the ground contact of the counterpart connector. The first ground contact 250 may be disposed to be in contact with the ground housing 330.

Figure 13:
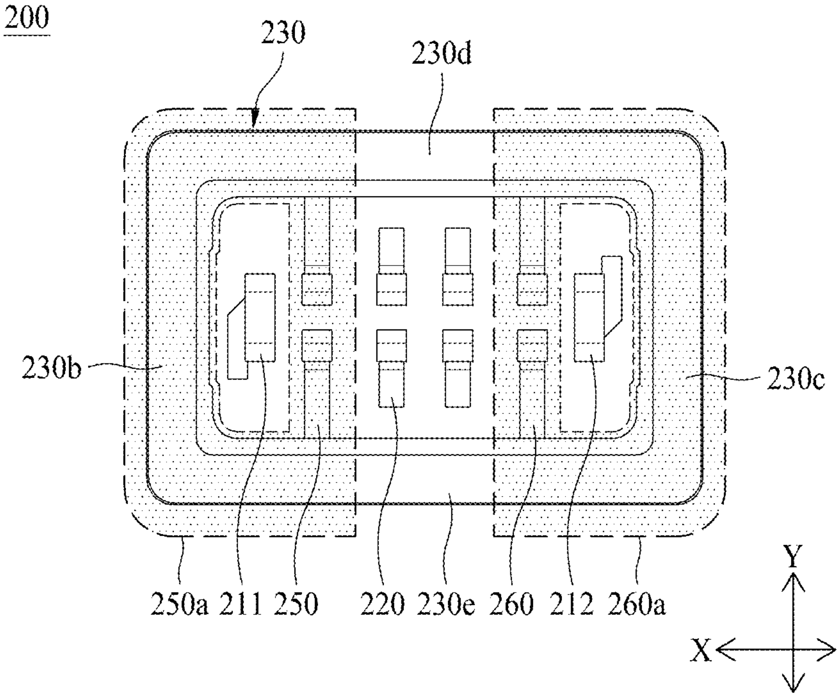
FIG. 13 is a schematic plan view for describing a ground loop in the board connector according to the first embodiment.
Figure 14:
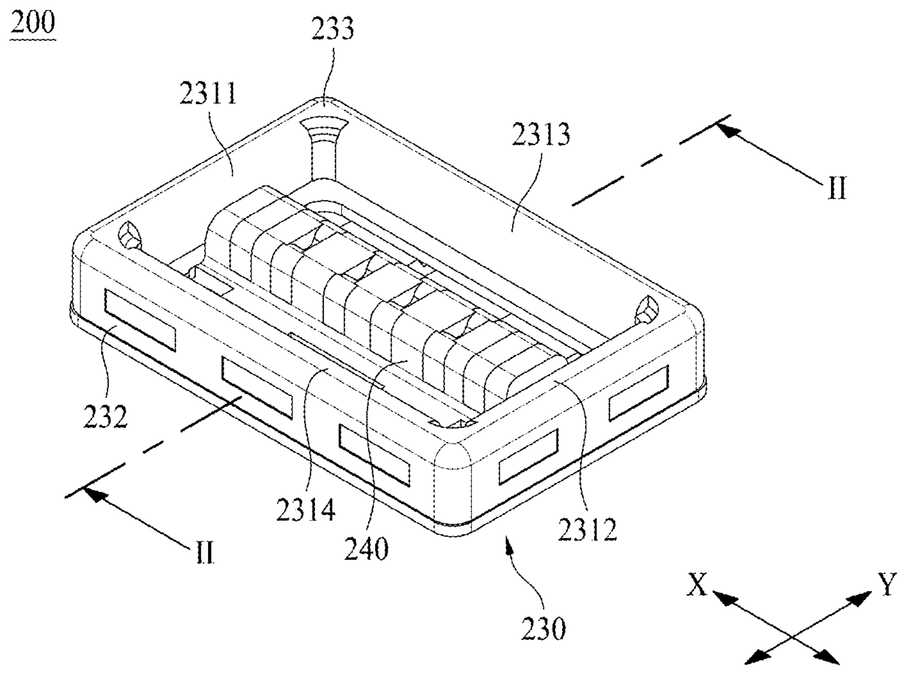
FIG. 14 is a schematic perspective view of a modified embodiment of the board connector according to the first embodiment.

The board connector 200 according to the first embodiment may include a plurality of the first ground contacts 250. The first ground contacts 250 may be disposed apart from each other in the second axial direction (Y-axis direction). In FIG. 13, the board connector 200 according to the first embodiment is illustrated as including two first ground contacts 250, but the present disclosure is not limited thereto, and the board connector 200 according to the first embodiment may include one first ground contact 250 or three or more first ground contacts 250. When three or more first ground contacts 250 are provided, the first ground contacts 250 may be disposed apart from each other in the first axial direction (X-axis direction) and the second axial direction (Y-axis direction). A gap formed as the first ground contacts 250 are spaced apart from each other may be blocked as the first ground contact 250 is connected to the ground contact of the counterpart connector.

Referring to FIGS. 2 to 7 and 13, the board connector 200 according to the first embodiment may include a second ground contact 260.

The second ground contact 260 is to be coupled to the insulating part 240. The second ground contact 260 may be mounted on the first board and be grounded. The second ground contact 260 may be coupled to the insulating part 240 through an assembly process. The second ground contact 260 may be integrally molded with the insulating part 240 through injection molding.

The second ground contact 260 may realize a blocking function against the second RF contact 212 together with the ground housing 230. The second ground contact 260 may be disposed between the transmission contacts 220 and the second RF contact 212 in the first axial direction (X-axis direction). Accordingly, the second RF contact 212 may be located between the second ground contact 260 and the second double block wall 230*c* in the first axial direction (X-axis direction), and may be located between the third double block wall 230*d* and the fourth double block wall 230*e* in the second axial direction (Y-axis direction). Therefore, in the board connector 200 according to the first embodiment, the blocking function against the second RF contact 212 may be enhanced using the second ground contact 260, the second double block wall 230*c*, the third double block wall 230*d*, and the fourth double block wall 230*e*.

The second ground contact 260, the second double block wall 230*c*, the third double block wall 230*d*, and the fourth double block wall 230*e* may be disposed on four sides of the second RF contact 212 to realize the blocking power against the RF signals. In this case, the second ground contact 260, the second double block wall 230*c*, the third double block wall 230*d*, and the fourth double block wall 230*e* may implement a ground loop 260*a* (illustrated in FIG. 13) in the second RF contact 212. Therefore, in the board connector 200 according to the first embodiment, by further enhancing the blocking function against the second RF contact 212 using the ground loop 260*a*, complete blocking of the second RF contact 212 can be realized.

The second ground contact 260 may be formed of an electrically conductive material. For example, the second ground contact 260 may be formed of a metal. When the counterpart connector is inserted into the inner space 230*a*, the second ground contact 260 may be connected to the ground contact of the counterpart connector. The second ground contact 260 may be disposed to be in contact with the ground housing 330.

The board connector 200 according to the first embodiment may include a plurality of the second ground contacts 260. The second ground contacts 260 may be disposed apart from each other in the second axial direction (Y-axis direction). In FIG. 13, the board connector 200 according to the first embodiment is illustrated as including two second ground contacts 260, but the present disclosure is not limited thereto, and the board connector 200 according to the first embodiment may include one second ground contact 260 or three or more second ground contacts 260. When three or more second ground contacts 260 are provided, the second ground contacts 260 may be disposed apart from each other in the first axial direction (X-axis direction) and the second axial direction (Y-axis direction). A gap formed as the second ground contacts 260 are spaced apart from each other may be blocked as the second ground contact 260 is connected to the ground contact of the counterpart connector.

Referring to FIGS. 2 to 7, 14, and 15, in the board connector 200 according to the first embodiment, the ground inner wall 231 of the ground housing 230 may be implemented to include a first sub-ground inner wall 2311, a second sub-ground inner wall 2312, a third sub-ground inner wall 2313, and a fourth sub-ground inner wall 2314.

The first sub-ground inner wall 2311 and the second sub-ground inner wall 2312 may be disposed to face each other in the first axial direction (X-axis direction). The third sub-ground inner wall 2313 and the fourth sub-ground inner wall 2314 may be disposed to face each other in the second axial direction (Y-axis direction). The first sub-ground inner wall 2311, the second sub-ground inner wall 2312, the third sub-ground inner wall 2313, and the fourth sub-ground inner wall 2314 may be coupled to the ground connection wall 233 while being spaced apart from each other. Each of the first sub-ground inner wall 2311, the second sub-ground inner wall 2312, the third sub-ground inner wall 2313, and the fourth sub-ground inner wall 2314 may be elastically moved based on a portion thereof coupled to the ground connection wall 233 to press the insulating part 240. Accordingly, in the board connector 200 according to the first embodiment, it is possible to enhance a coupling force between the ground housing 230 and the insulating part 240. Further, when the counterpart connector is inserted into the inner space 230*a*, each of the first sub-ground inner wall 2311, the second sub-ground inner wall 2312, the third sub-ground inner wall 2313, and the fourth sub-ground inner wall 2314 may be pushed by the counterpart connector to further press the insulating part 240, and thus the coupling force between the ground housing 230 and the insulating part 240 may be further increased.

Figure 15:
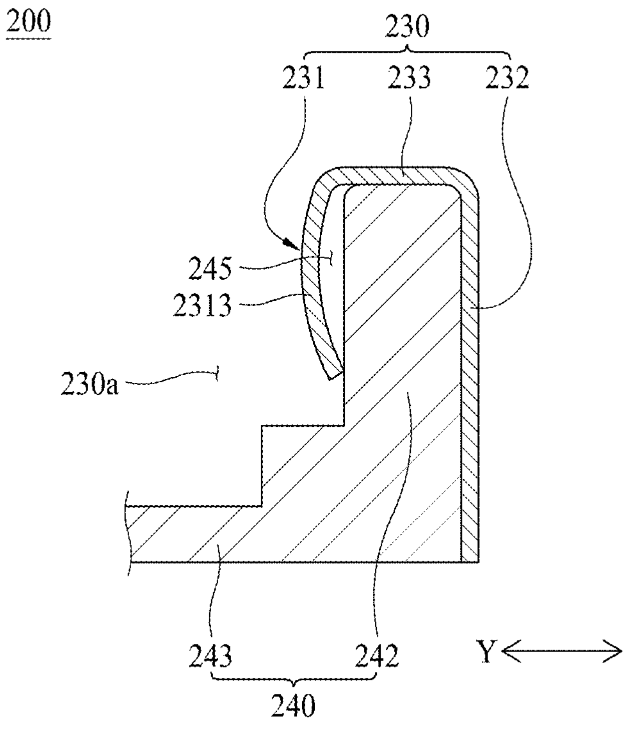
FIG. 15 is a schematic partial side cross-sectional view along line II-II of FIG. 14 and illustrates the modified embodiment of the board connector according to the first embodiment.

When the first sub-ground inner wall 2311, the second sub-ground inner wall 2312, the third sub-ground inner wall 2313, and the fourth sub-ground inner wall 2314 are provided, the insulating part 240 may include a plurality of press grooves 245 (illustrated in FIG. 15). The press grooves 245 may be formed in an inner surface of the insertion member 242. The inner surface of the insertion member 242 is a surface facing the inner space 230*a*. A distance that each of the first sub-ground inner wall 2311, the second sub-ground inner wall 2312, the third sub-ground inner wall 2313, and the fourth sub-ground inner wall 2314 is elastically movable may be increased using the press grooves 245. Therefore, in the board connector 200 according to the first embodiment, the first sub-ground inner wall 2311, the second sub-ground inner wall 2312, the third sub-ground inner wall 2313, and the fourth sub-ground inner wall 2314 may be elastically moved, to further increase a pressing force for pressing the insertion member 242.

Board Connector 300 According to Second Embodiment

Figure 16:
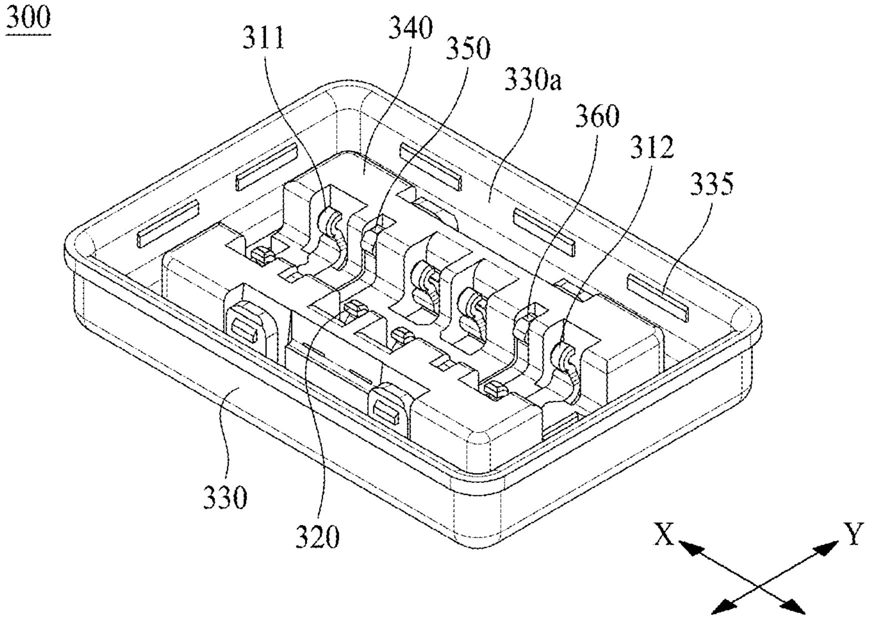
FIG. 16 is a schematic perspective view of the board connector according to the second embodiment.
Figure 17:
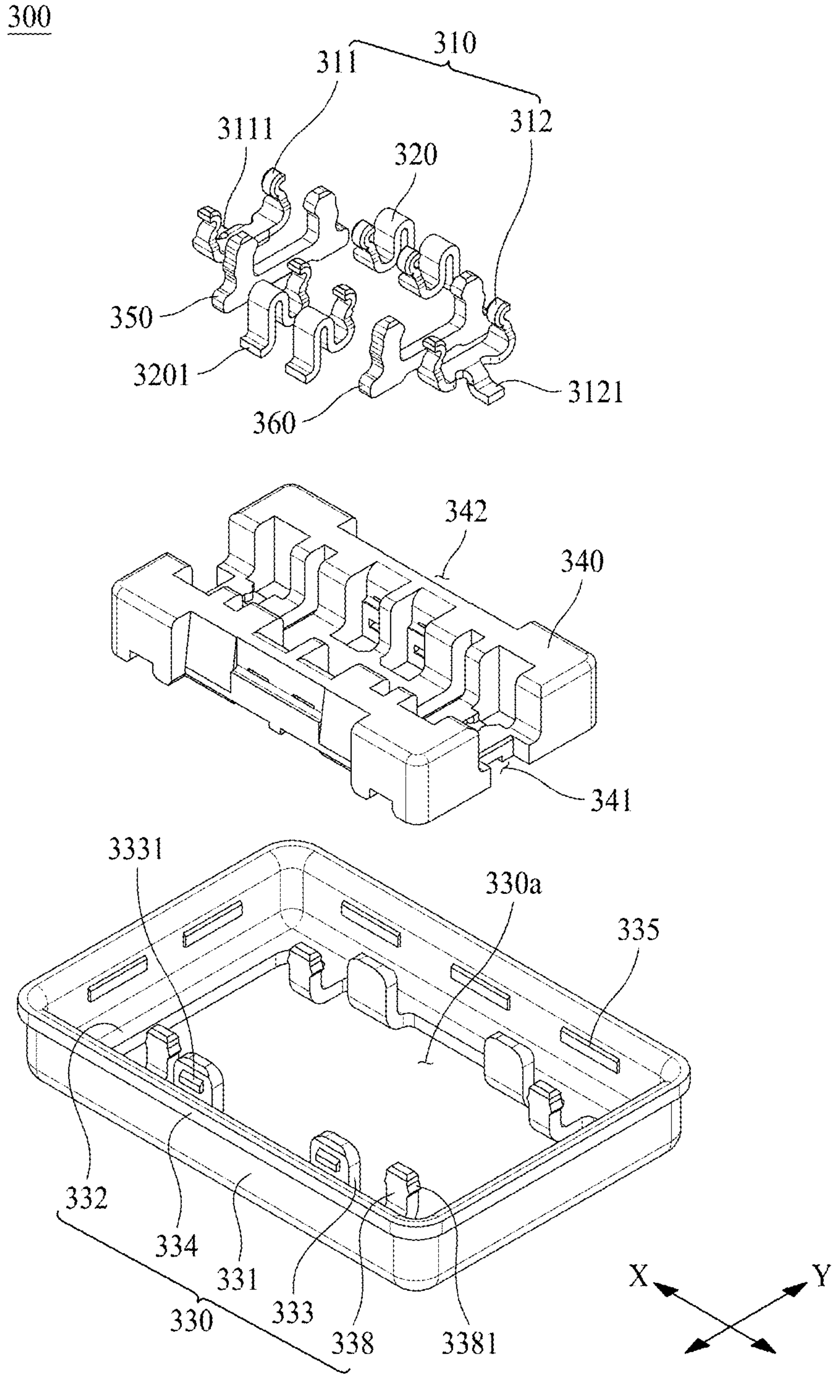
FIG. 17 is a schematic exploded perspective view of the board connector according to the second embodiment.

Referring to FIGS. 2, 16, and 17, the board connector 300 according to the second embodiment may include a plurality of RF contacts 310, a plurality of transmission contacts 320, a ground housing 330, and an insulating part 340.

The RF contacts 310 are configured to transmit RF signals. The RF contacts 310 may transmit ultra-high frequency RF signals. The RF contacts 310 may be supported by the insulating part 340. The RF contacts 310 may be coupled to the insulating part 340 through an assembly process. The RF contacts 310 may be integrally molded with the insulating part 340 through injection molding.

The RF contacts 310 may be disposed apart from each other. The RF contacts 310 may be mounted on the second board to be electrically connected to the second board. The RF contacts 310 may be connected to the RF contacts of a counterpart connector to be electrically connected to the first board on which the counterpart connector is mounted. Accordingly, the second board and the first board may be electrically connected to each other. In this case, the counterpart connector may be implemented as the board connector 200 according to the first embodiment. Meanwhile, the counterpart connector in the board connector 200 according to the first embodiment may be implemented as the board connector 300 according to the second embodiment.

Among the RF contacts 310, a first RF contact 311 and a second RF contact 312 may be spaced apart from each other in the first axial direction (X-axis direction). The first RF contact 311 and the second RF contact 312 may be supported by the insulating part 340 while being spaced apart from each other in the first axial direction (X-axis direction). In FIG. 17, the board connector 300 according to the second embodiment is illustrated as including two RF contacts 310, but the present disclosure is not limited thereto, and the board connector 300 according to the second embodiment may include three or more RF contacts 310. Meanwhile, in this specification, description will be made assuming a case in which the board connector 300 according to the second embodiment includes two RF contacts 310.

The first RF contact 311 may include a first RF mounting member 3111. The first RF mounting member 3111 may be mounted on the second board. Accordingly, the first RF contact 311 may be electrically connected to the second board through the first RF mounting member 3111. The first RF contact 311 may be formed of an electrically conductive material. For example, the first RF contact 311 may be formed of a metal. The first RF contact 311 may be connected to any one of RF contacts of the counterpart connector.

The second RF contact 312 may include a second RF mounting member 3121. The second RF mounting member 3121 may be mounted on the second board. Accordingly, the second RF contact 312 may be electrically connected to the second board through the second RF mounting member 3121. The second RF contact 312 may be formed of an electrically conductive material. For example, the second RF contact 312 may be formed of a metal. The second RF contact 312 may be connected to any one of the RF contacts of the counterpart connector.

Referring to FIGS. 2, 16, and 17, the transmission contacts 320 are coupled to the insulating part 340. The transmission contacts 320 may function to transmit signals, data, and the like. The transmission contacts 320 may be coupled to the insulating part 340 through an assembly process. The transmission contacts 320 may be integrally molded with the insulating part 340 through injection molding.

The transmission contacts 320 may be disposed between the first RF contact 311 and the second RF contact 312 in the first axial direction (X-axis direction). Accordingly, the transmission contacts 320 may be disposed in a space in which the first RF contact 311 and the second RF contact 312 are spaced apart from each other in order to reduce RF signal interference between the first RF contact 311 and the second RF contact 312. Therefore, in the board connector 300 according to the second embodiment, by increasing a distance between the first RF contact 311 and the second RF contact 312, it is possible to reduce the RF signal interference, and by arranging the transmission contacts 320 in the space for the first RF contact 311 and the second RF contact 312, it is possible to improve space utilization of the insulating part 340.

The transmission contacts 320 may be disposed apart from each other. The transmission contacts 320 may be mounted on the second board to be electrically connected to the second board. In this case, a transmission mounting member 3201 of each of the transmission contacts 320 may be mounted on the second board. The transmission contacts 320 may be formed of an electrically conductive material. For example, the transmission contacts 320 may be formed of a metal. The transmission contacts 320 may be connected to transmission contacts of the counterpart connector to be electrically connected to the first board on which the counterpart connector is mounted. Accordingly, the second board and the first board may be electrically connected to each other.

Meanwhile, in FIG. 17, the board connector 300 according to the second embodiment is illustrated as including four transmission contacts 320, but the present disclosure is not limited thereto, and the board connector 300 according to the second embodiment may include five or more transmission contacts 320. The transmission contacts 320 may be spaced apart from each other in the first axial direction (X-axis direction) and the second axial direction (Y-axis direction).

Referring to FIGS. 16 to 19, the ground housing 330 is configured such that the insulating part 340 is coupled thereto. The ground housing 330 may be mounted on the second board and be grounded. Accordingly, the ground housing 330 may realize a blocking function against signals, electromagnetic waves, etc. of the RF contacts 310. In this case, the ground housing 330 may prevent electromagnetic waves generated at the RF contacts 310 from interfering with signals of circuit parts located in the vicinity thereof in the electronic device, and may prevent electromagnetic waves generated at the circuit parts located in the vicinity thereof in the electronic device from interfering with RF signals transmitted by the RF contacts 310. Accordingly, the board connector 300 according to the second embodiment may use the ground housing 330 to contribute to improving EMI blocking performance and EMC performance. The ground housing 330 may be formed of an electrically conductive material. For example, the ground housing 330 may be formed of a metal.

The ground housing 330 may be disposed to surround sides of an inner space 330*a*. The insulating part 340 may be located in the inner space 330*a*. All of the first RF contact 311, the second RF contact 312, and the transmission contacts 22 may be located in the inner space 330*a*. In this case, all of the first RF mounting member 3111, the second RF mounting member 3121, and the transmission mounting members 3201 may also be located in the inner space 330*a*. Therefore, the ground housing 330 may implement a blocking wall against both of the first RF contact 311 and the second RF contact 312, and thus may realize complete blocking by enhancing a blocking function against the first RF contact 311 and the second RF contact 312. The counterpart connector may be inserted into the inner space 330*a*. In this case, a portion of the counterpart connector may be inserted into the inner space 330*a*, and a portion of the board connector 300 according to the second embodiment may be inserted into the inner space of the counterpart connector.

The ground housing 330 may be disposed to surround all of the sides of the inner space 330*a*. The inner space 330*a* may be disposed inside the ground housing 330. When the ground housing 330 is entirely formed in a rectangular loop shape, the inner space 330*a* may be formed in a rectangular parallelepiped shape. In this case, the ground housing 330 may be disposed to surround four sides of the inner space 330*a*.

Referring to FIGS. 7, 8, and 16 to 19, the ground housing 330 may include a ground sidewall 331 and a ground bottom 332.

The ground sidewall 331 is to be disposed to surround the sides of the inner space 330*a*. The ground sidewall 331 may be disposed to surround all of the sides of the inner space 330*a*. When the counterpart connector is inserted into the inner space 330*a*, the ground sidewall 331 may be connected to the ground housing of the counterpart connector. For example, the ground sidewall 331 may be connected to the ground outer wall 232 of the ground housing 230 of the counterpart connector. The ground sidewall 331 may be formed in a plate shape disposed in the vertical direction.

The ground bottom 332 is configured to protrude from a lower end of the ground sidewall 331 toward the inner space 330*a*. That is, the ground bottom 332 may protrude inward the ground sidewall 331. The ground bottom 332 may be formed in a closed loop shape so as to extend along the lower end of the ground sidewall 331. The ground bottom 332 may be mounted on the second board and be grounded. Accordingly, the ground sidewall 331 may be grounded through the ground bottom 332. In this case, the ground housing 330 may be grounded through the ground bottom 332. When the counterpart connector is inserted into the inner space 330*a*, the ground bottom 332 may be connected to the ground housing of the counterpart connector. For example, the ground bottom 332 may be connected to the ground connection wall 233 of the ground housing 230 of the counterpart connector. The ground bottom 332 may be formed in a plate shape disposed in the horizontal direction.

The ground bottom 332 and the ground sidewall 331 may be disposed to surround the inner space 330*a*. In this case, the first RF contact 311 and the second RF contact 312 may be located in the inner space 330*a* surrounded by the ground bottom 332 and the ground sidewall 331. Therefore, the ground bottom 332 and the ground sidewall 331 may implement a blocking wall against both of the first RF contact 311 and the second RF contact 312, and thus may realize complete blocking by enhancing the blocking function against the first RF contact 311 and the second RF contact 312.

The ground bottom 332 and the ground sidewall 331 may be integrally formed. In this case, the ground housing 330 may be formed as one body without a seam. The ground housing 330 may be formed as one body without a seam by a metal injection method such as a metal die casting method, a MIM method, or the like. The ground housing 330 may be formed as one body without a seam by CNC machining, MCT machining, or the like.

Referring to FIGS. 7, 8, and 16 to 19, the ground housing 330 may include a ground arm 333.

The ground arm 333 is configured to protrude upward from the ground bottom 332. The ground arm 333 may be elastically moved based on a portion thereof coupled to the ground bottom 332. In this case, when the counterpart connector is inserted into the inner space 330*a*, the ground arm 333 may press the ground housing of the counterpart connector and thus may be elastically rotated about the portion thereof connected to the ground bottom 332 toward the inner space 330*a*. Accordingly, the ground arm 333 presses the ground housing of the counterpart connector using a restoring force and thus is brought into strong contact with the ground housing of the counterpart connector. Therefore, in the board connector 300 according to the second embodiment, contact between the ground housing 330 and the ground housing of the counterpart connector using the ground arm 333 may be improved, and thus the blocking function against the first RF contact 311 and the second RF contact 312 may be further enhanced. For example, the ground arm 333 may be brought into contact with the ground inner wall 231 of the ground housing 230 of the counterpart connector. In this case, the ground housing 230 of the counterpart connector may be inserted into a space between the ground arm 333 and the ground sidewall 331. Accordingly, when the ground inner wall 231 of the ground housing 230 of the counterpart connector is brought into contact with the ground arm 333 and when the ground outer wall 232 of the ground housing 230 of the counterpart connector is brought into contact with the ground sidewall 331, the ground connection wall 233 of the ground housing 230 of the counterpart connector may be brought into contact with the ground bottom 332.

Figure 19:
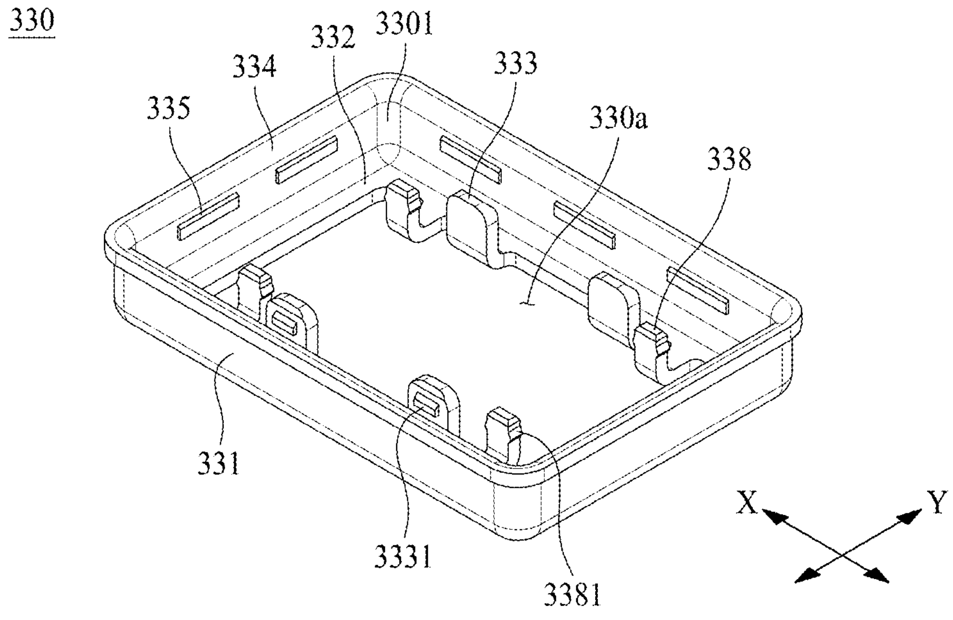
FIG. 19 is a schematic perspective view of a ground housing of the board connector according to the second embodiment.

The ground housing 330 may include a plurality of the ground arms 333. In this case, the ground arms 333 may be disposed apart from each other along the ground bottom 332. In FIG. 19, the ground housing 330 is illustrated as including four ground arms 333, but the present disclosure is not limited thereto, and the ground housing 330 may include two ground arms 333, three ground arms 333, or five or more ground arms 333.

The ground housing 330 may include a ground protrusion 3331 protruding from an inner surface of the ground arm

333. The inner surface of the ground arm 333 is a surface of the ground arm 333, which faces the ground sidewall 331. Accordingly, the ground protrusion 3331 may protrude toward the ground sidewall 331. When the counterpart connector is inserted between the ground protrusion 3331 and the ground sidewall 331, the ground arm 333 may be elastically moved based on the portion thereof coupled to the ground bottom 332, as illustrated in FIG. 8. Accordingly, the ground protrusion 3331 is brought into stronger contact with the ground housing of the counterpart connector using the restoring force of the ground arm 333. Therefore, in the board connector 300 according to the second embodiment, the contact between the ground housing 330 and the ground housing of the counterpart connector may be improved using the ground arm 333 in which the ground protrusion 3331 is formed, and thus the blocking function against the first RF contact 311 and the second RF contact 312 may be further enhanced.

Referring to FIGS. 7, 8, and 16 to 19, the ground housing 330 may include a ground upper wall 334.

The ground upper wall 334 is configured to protrude from an upper end of the ground sidewall 331 toward a side opposite to the inner space 330*a*. In this case, the ground upper wall 334 may protrude outward the ground sidewall 331. The ground upper wall 334 may be formed in a closed loop shape so as to extend along the upper end of the ground sidewall 331. The ground upper wall 334 may be formed in a plate shape disposed in the horizontal direction.

The ground upper wall 334, the ground bottom 332, and the ground sidewall 331 may be integrally formed. In this case, the ground housing 330 may be formed as one body without a seam. The ground housing 330 may be formed as one body without a seam by a metal injection method such as a metal die casting method, a MIM method, or the like. The ground housing 330 may be formed as one body without a seam by CNC machining, MCT machining, or the like.

A connection portion between the ground upper wall 334 and the ground sidewall 331 may be formed in a rounded shape, as illustrated in FIG. 8. Accordingly, the connection portion between the ground upper wall 334 and the ground sidewall 331 may serve to guide the counterpart connector when the counterpart connector is inserted into the inner space 330*a*. In this case, a portion facing the inner space 330*a* in the connection portion between the ground upper wall 334 and the ground sidewall 331 may have a curved surface and may be formed in a rounded shape. The connection portion between the ground upper wall 334 and the ground sidewall 331 may guide the ground housing of the counterpart connector to be inserted between the ground sidewall 331 and the ground arm 333.

Referring to FIGS. 8 to 12 and 20, the ground housing 330 may include the following configurations in order to further enhance the blocking function by improving contact between the ground sidewall 331 and the ground housing of the counterpart connector.

First, as illustrated in FIG. 9, the ground housing 330 may include the connection protrusion 335. The connection protrusion 335 may be formed on an inner surface of the ground sidewall 331. The connection protrusion 335 may protrude from the inner surface of the ground sidewall 331. The connection protrusion 335 may be inserted into the ground housing 230 of the counterpart connector. In this case, the connection protrusion 335 may be inserted into the connection groove 235 of the ground housing 230 of the counterpart connector. Accordingly, in the board connector 300 according to the second embodiment, the contact between the ground housing 330 and the ground housing 230 of the counterpart connector may be improved using the connection protrusion 335, and thus the blocking function against the first RF contact 311 and the second RF contact 312 may be further enhanced. In FIG. 9, the connection protrusion 335 is illustrated as being formed to have a smaller length than the connection groove 235 in the vertical direction, but the present disclosure is not limited thereto, and the connection protrusion 335 and the connection groove 235 may be formed to have substantially the same length. The ground housing 330 may include a plurality of the connection protrusions 335. In this case, the connection protrusions 335 may be disposed apart from each other along the inner surface of the ground sidewall 331.

Next, as illustrated in FIG. 10, the ground housing 330 may include the connection groove 336. The connection groove 336 may be formed in the inner surface of the ground sidewall 331. The connection groove 336 may be implemented as a groove which is formed in the inner surface of the ground sidewall 331 to have a predetermined depth. The ground housing 230 of the counterpart connector may be inserted into the connection groove 336. In this case, the connection protrusion 236 of the ground housing 230 of the counterpart connector may be inserted into the connection groove 336. Accordingly, in the board connector 300 according to the second embodiment, the contact between the ground housing 330 and the ground housing 230 of the counterpart connector may be improved using the connection groove 336, and thus the blocking function against the first RF contact 311 and the second RF contact 312 may be further enhanced. In FIG. 10, the connection groove 336 is illustrated as being formed to have a greater length than the connection protrusion 236 in the vertical direction, but the present disclosure is not limited thereto, and the connection groove 336 and the connection protrusion 236 may be formed to have substantially the same length. Meanwhile, the ground sidewall 331 may support the connection protrusion 236 inserted into the connection groove 336, and thus it is possible to prevent the connection protrusion 236 from being separated from the connection groove 336. The ground housing 330 may include a plurality of the connection grooves 336. In this case, the connection grooves 336 may be disposed apart from each other along the inner surface of the ground sidewall 331.

Next, as illustrated in FIG. 11, when the ground housing 330 includes the connection protrusion 335, the connection protrusion 335 may support the connection protrusion 236 of the ground housing 230 of the counterpart connector. Accordingly, in the board connector 300 according to the second embodiment, the contact between the ground housing 330 and the ground housing 230 of the counterpart connector may be improved using the connection protrusion 335, and thus the blocking function against the first RF contact 311 and the second RF contact 312 may be further enhanced. Meanwhile, the connection protrusion 335 may be disposed above the connection protrusion 236 to support the connection protrusion 236.

Figure 20:
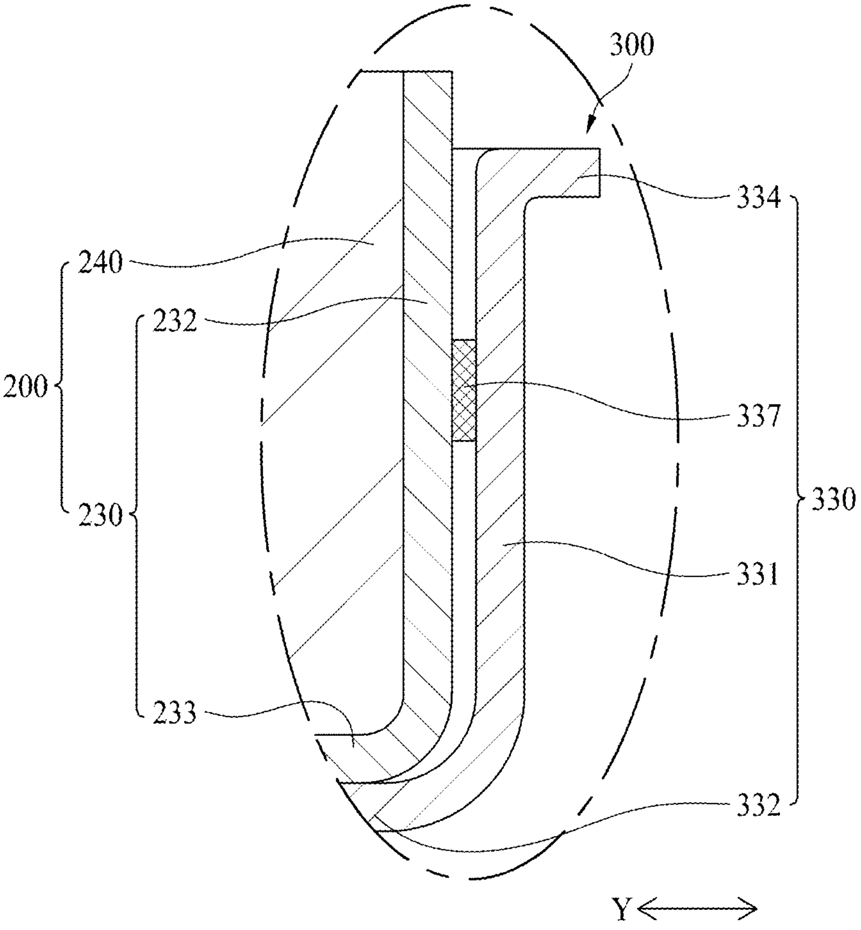
FIG. 20 is a schematic enlarged side cross-sectional view of the portion B of FIG. 7 and illustrates a state in which the board connector according to the second embodiment and the board connector according to the first embodiment are coupled to each other.

Next, as illustrated in FIG. 8, the ground housing 330 may be brought into contact with the ground housing 230 of the counterpart connector through surface contact between the inner surface of the ground sidewall 331 and the ground housing 230 of the counterpart connector. In this case, a gap may be generated between the inner surface of the ground sidewall 331 and the ground housing 230 of the counterpart connector, and in order to compensate for the gap, the ground housing 330 may include a conductive member 337 as illustrated in FIG. 20. The conductive member 337 may be coupled to the inner surface of the ground sidewall 331.

The conductive member 337 may be formed in a closed loop shape so as to extend along the inner surface of the ground sidewall 331, including a corner portion 3301 (illustrated in FIG. 19) of the inner surface of the ground sidewall 331. Accordingly, in the board connector 300 according to the second embodiment, the contact between the ground housing 330 and the ground housing 230 of the counterpart connector may be improved using the conductive member 337, and thus the blocking function against the first RF contact 311 and the second RF contact 312 may be further enhanced. Further, in the case of the embodiment in which the connection protrusion 335 and the connection groove 336 are used, it is difficult to implementing the embodiment (the connection protrusion 335 and the connection groove 336) in the corner portion 3301 of the inner surface of the ground sidewall 331, whereas in the case of the embodiment in which the conductive member 337 is used, it is possible to improve ease of the operation of implementing the conductive member 337 in the corner portion 3301 of the inner surface of the ground sidewall 331. The conductive member 337 may be formed of an electrically conductive material so as to electrically connect the ground sidewall 331 and the ground housing 230 of the counterpart connector. For example, the conductive member 337 may be formed of a metal. The conductive member 337 may be separately manufactured and then be coupled to the ground sidewall 331 by being mounted, attached, or fastened to the inner surface of the ground sidewall 331. The conductive member 337 may be coupled to the ground sidewall 331 by an electrically conductive blocking material being applied to the inner surface of the ground sidewall 331.

Referring to FIGS. 16 to 19, the ground housing 330 may include a coupling member 338.

The coupling member 338 is configured to protrude upward from the ground bottom 332. When the ground housing 330 and the insulating part 340 are coupled to each other, the coupling member 338 may be inserted into the insulating part 340. Accordingly, the coupling member 338 may firmly couple the ground housing 330 and the insulating part 340. The coupling member 338 may be coupled to the insulating part 340 in an interference fit manner. The coupling member 338 and the ground bottom 332 may be integrally formed. A coupling groove (not illustrated) into which the coupling member 338 is inserted may be formed in the insulating part 340. The coupling groove may be formed in a lower surface of the insulating part 340.

The ground housing 330 may include a plurality of the coupling members 338. In this case, the coupling members 338 may be disposed apart from each other along the ground bottom 332. In FIG. 19, the ground housing 330 is illustrated as including four coupling members 338, but the present disclosure is not limited thereto, and the ground housing 330 may include two coupling members 338, three coupling members 338, or five or more coupling members 338. The same number of coupling grooves as the coupling members 338 may be formed in the insulating part 340.

The ground housing 330 may include a wedge member 3381 protruding from the coupling member 338. When the coupling member 338 is inserted into the insulating part 340, the wedge member 3381 may be stuck in the insulating part 340 to fix the ground housing 330 and the insulating part 340. Therefore, in the board connector 300 according to the second embodiment, the ground housing 330 and the insulating part 340 may be more firmly coupled using the wedge member 3381. When the coupling member 338 is disposed apart from the ground sidewall 331 in the second axial direction (Y-axis direction), the wedge member 3381 may protrude from a side surface of the coupling member 338 in the first axial direction (X-axis direction). The wedge member 3381 and the coupling member 338 may be integrally formed.

Referring to FIGS. 16 to 19, the insulating part 340 is to support the RF contacts 310. The RF contacts 310 and the transmission contacts 320 may be coupled to the insulating part 340. The insulating part 340 may be formed of an insulating material. The insulating part 340 may be coupled to the ground housing 330 such that the RF contacts 310 are located in the inner space 330*a*.

Figure 18:
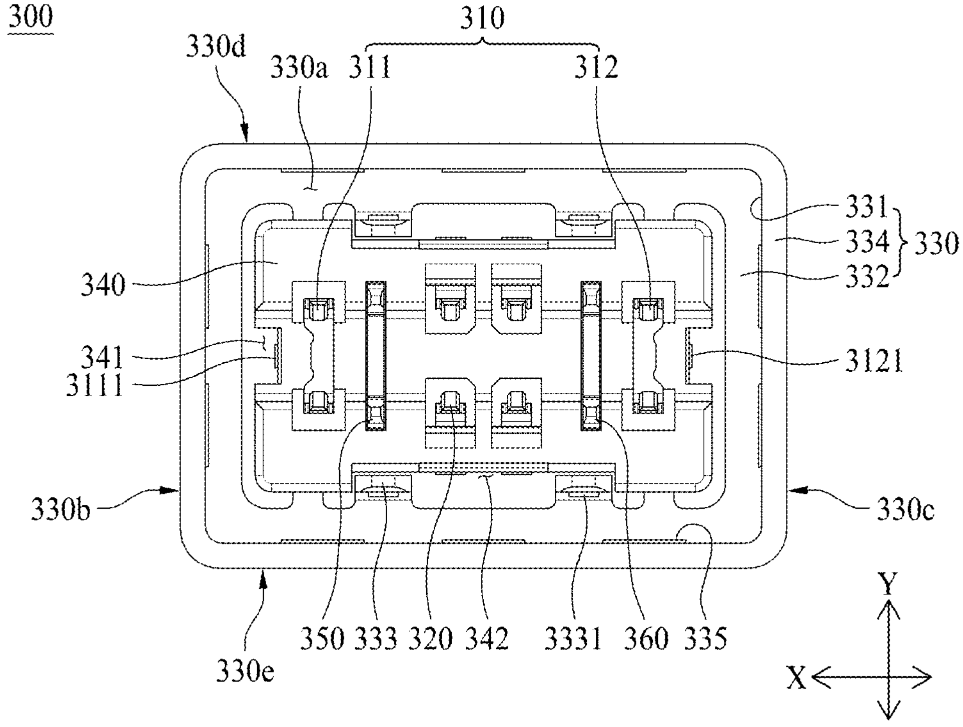
FIG. 18 is a schematic plan view of the board connector according to the second embodiment.

The insulating part 340 may include a soldering inspection window 341 (illustrated in FIG. 18).

The soldering inspection window 341 may be formed to pass through the insulating part 340. The soldering inspection window 341 may be used to check the state in which the first RF mounting member 3111 is mounted on the second board. In this case, the first RF contact 311 may be coupled to the insulating part 340 such that the first RF mounting member 3111 is located in the soldering inspection window 341. Accordingly, the first RF mounting member 3111 is not covered by the insulating part 340. Therefore, in the state in which the board connector 300 according to the second embodiment is mounted on the second board, the operator may check the state in which the first RF mounting member 3111 is mounted on the second board through the soldering inspection window 341. Accordingly, in the board connector 300 according to the second embodiment, even when the entire first RF contact 311, including the first RF mounting member 3111, is located inside the ground housing 330, it is possible to improve accuracy of a mounting operation of mounting the first RF contact 311 on the second board. The soldering inspection window 341 may be formed to pass through the insulating member 340.

The insulating part 340 may include a plurality of the soldering inspection windows 341. In this case, the second RF mounting member 3121 and the transmission mounting members 3201 may be located in the soldering inspection windows 341. Therefore, in the state in which the board connector 300 according to the second embodiment is mounted on the second board, the operator may check the state in which the first RF mounting member 3111, the second RF mounting member 3121, and the transmission mounting members 3201 are mounted on the second board through the soldering inspection windows 341. Accordingly, in the board connector 300 according to the second embodiment, it is possible to improve accuracy of a mounting operation of mounting the first RF contact 311, the second RF contact 312, and the transmission contacts 320 on the second board.

Referring to FIGS. 7, 8, and 16 to 19, the insulating part 340 may include a movement groove 342.

The movement groove 342 is configured to move the ground arm 333. The movement groove 342 may be implemented as a groove which is formed in the insulating part 340 to have a predetermined depth. The movement groove 342 may be formed in a side surface of the insulating part 340, which faces the ground sidewall 331. When the counterpart connector is inserted into the inner space 330*a* to press the ground arm 333, the ground arm 333 may be inserted into the movement groove 342 while being elastically rotated about the portion thereof connected to the ground bottom 332. Accordingly, in the board connector 300 according to the second embodiment, a distance that the ground arm 333 can be elastically moved may be increased using the movement groove 342, and thus the ground arm 333 is implemented to be brought into stronger contact with the counterpart connector by increasing a restoring force. Therefore, in the board connector 300 according to the second embodiment, the contact between the ground housing 330 and the ground housing of the counterpart connector may be further improved.

The movement groove 342 may be formed to have a size increased in a direction from a lower side to an upper side thereof. Accordingly, the movement groove 342 may be formed deeper in a portion in which the ground arm 333 is rotated about the portion thereof connected to the ground bottom 332 at a longer distance. Therefore, in the board connector 300 according to the second embodiment, by increasing the distance that the ground arm 333 can be moved, the contact between the ground housing 330 and the ground housing of the counterpart connector may be improved, and at the same time, a degree of durability degradation of the insulating part 340 may be reduced due to the movement groove 342. The lower side of the movement groove 342 may be disposed at a position where the ground arm 333 corresponds to the portion connected to the ground bottom 332.

The insulating part 340 may include a plurality of the movement grooves 342. The movement grooves 342 may be disposed apart from each other. The plurality of ground arms 333 may be respectively inserted into the movement grooves 342. In this case, each of the movement grooves 342 may be formed to have a greater size than each of the ground arms 333.

Referring to FIGS. 16 to 21, the board connector 300 according to the second embodiment may include a first ground contact 350.

The first ground contact 350 is to be coupled to the insulating part 340. The first ground contact 350 may be mounted on the second board and be grounded. The first ground contact 350 may be coupled to the insulating part 340 through an assembly process. The first ground contact 350 may be integrally molded with the insulating part 340 through injection molding.

Figure 21:
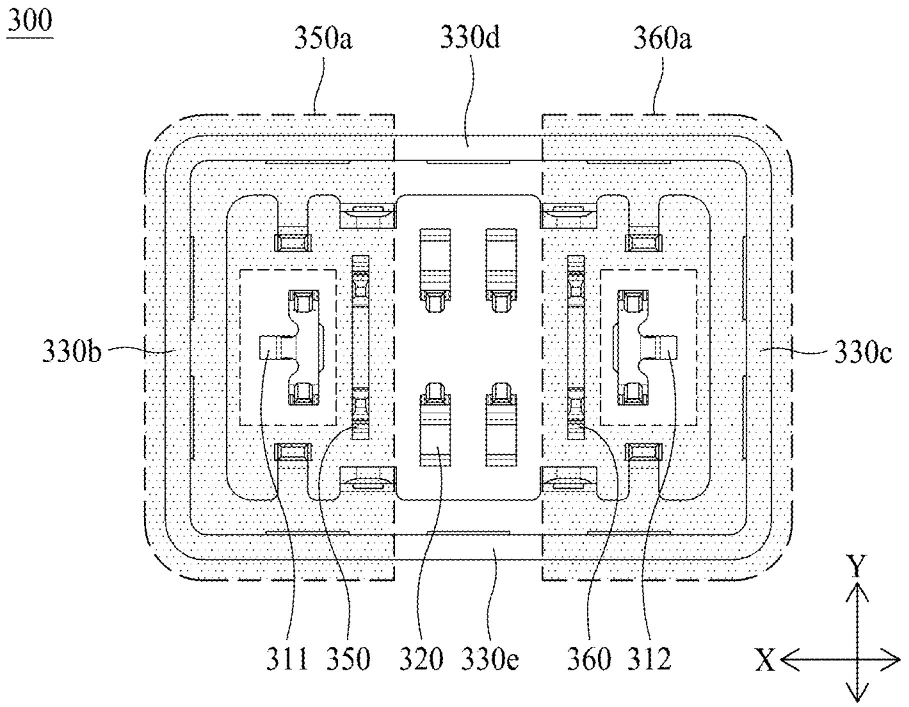
FIG. 21 is a schematic plan view for describing a ground loop in the board connector according to the second embodiment.

The first ground contact 350 may realize a blocking function against the first RF contact 311 together with the ground housing 330. In this case, the ground housing 330 may include a first blocking wall 330*b*, a second blocking wall 330*c*, a third blocking wall 330*d*, and a fourth blocking wall 330*e*, as illustrated in FIGS. 18 and 21. Each of the first blocking wall 330*b*, the second blocking wall 330*c*, the third blocking wall 330*d*, and the fourth blocking wall 330*e* may be implemented by the ground sidewall 331, the ground bottom 332, and the ground upper wall 334. The first blocking wall 330*b* and the second blocking wall 330*c* are disposed to face each other in the first axial direction (X-axis direction). The first RF contact 311 may be located between the first blocking wall 330*b* and the second blocking wall 330*c* in the first axial direction (X-axis direction). The first RF contact 311 may be located at a position where a distance from the first blocking wall 330*b* is shorter than a distance from the second blocking wall 330*c* in the first axial direction (X-axis direction). The third blocking wall 330*d* and the fourth blocking wall 330*e* are disposed to face each other in the second axial direction (Y-axis direction). The first RF contact 311 may be located between the third blocking wall 330*d* and the fourth blocking wall 330*e* in the second axial direction (Y-axis direction). The first RF contact 311 may be located apart from each of the third blocking wall 330*d* and the fourth blocking wall 330*e* in the second axial direction (Y-axis direction) by substantially the same distance.

The first ground contact 350 may be disposed between the first RF contact 311 and the transmission contacts 320 in the first axial direction (X-axis direction). Accordingly, the first RF contact 311 may be located between the first blocking wall 330*b* and the first ground contact 350 in the first axial direction (X-axis direction), and may be located between the third blocking wall 330*d* and the fourth blocking wall 330*e* in the second axial direction (Y-axis direction). Therefore, in the board connector 300 according to the second embodiment, the blocking function against the first RF contact 311 may be enhanced using the first ground contact 350, the first blocking wall 330*b*, the third blocking wall 330*d*, and the fourth blocking wall 330*e*.

The first ground contact 350, the first blocking wall 330*b*, the third blocking wall 330*d*, and the fourth blocking wall 330*e* may be disposed on four sides of the first RF contact 311 to realize blocking power against the RF signals. In this case, the first ground contact 350, the first blocking wall 330*b*, the third blocking wall 330*d*, and the fourth blocking wall 330*e* may implement a ground loop 350*a* (illustrated in FIG. 21) of the first RF contact 311. Therefore, in the board connector 300 according to the second embodiment, by further enhancing the blocking function against the first RF contact 311 using the ground loop 350*a*, complete blocking of the first RF contact 311 can be realized.

The first ground contact 350 may be formed of an electrically conductive material. For example, the first ground contact 350 may be formed of a metal. When the counterpart connector is inserted into the inner space 330*a*, the first ground contact 350 may be connected to the ground contact of the counterpart connector.

The board connector 300 according to the second embodiment may include a plurality of the first ground contacts 350. The first ground contacts 350 may be disposed apart from each other in the second axial direction (Y-axis direction). A gap formed as the first ground contacts 350 are spaced apart from each other may be blocked as the first ground contact 350 is connected to the ground contact of the counterpart connector.

Referring to FIGS. 16 to 21, the board connector 300 according to the second embodiment may include a second ground contact 360.

The second ground contact 360 is to be coupled to the insulating part 340. The second ground contact 360 may be mounted on the second board and be grounded. The second ground contact 360 may be coupled to the insulating part 340 through an assembly process. The second ground contact 360 may be integrally molded with the insulating part 340 through injection molding.

The second ground contact 360 may realize a blocking function against the second RF contact 312 together with the ground housing 330. The second ground contact 360 may be disposed between the transmission contacts 320 and the second RF contact 212 in the first axial direction (X-axis direction). Accordingly, the second RF contact 312 may be located between the second ground contact 360 and the second blocking wall 330*c* in the first axial direction (X-axis direction), and may be located between the third blocking wall 330*d* and the fourth blocking wall 330*e* in the second axial direction (Y-axis direction). Therefore, in the board connector 300 according to the second embodiment, the blocking function against the second RF contact 312 may be enhanced using the second ground contact 360, the second blocking wall 330*c*, the third blocking wall 330*d*, and the fourth blocking wall 330*e*.

The second ground contact 360, the second blocking wall 330*c*, the third blocking wall 330*d*, and the fourth blocking wall 330*e* may be disposed on four sides of the second RF contact 312 to realize blocking power against the RF signals.

In this case, the second ground contact 360, the second blocking wall 330*c*, the third blocking wall 330*d*, and the fourth blocking wall 330*e* may implement a ground loop 360*a* (illustrated in FIG. 21) in the second RF contact 312. Therefore, in the board connector 300 according to the second embodiment, by further enhancing the blocking function against the second RF contact 312 using the ground loop 360*a*, complete blocking of the second RF contact 312 can be realized.

The second ground contact 360 may be formed of an electrically conductive material. For example, the second ground contact 360 may be formed of a metal. When the counterpart connector is inserted into the inner space 330*a*, the second ground contact 360 may be connected to the ground contact of the counterpart connector.

The board connector 300 according to the second embodiment may include a plurality of the second ground contacts 360. The second ground contacts 360 may be disposed apart from each other in the second axial direction (Y-axis direction). A gap formed as the second ground contacts 360 are spaced apart from each other may be blocked as the second ground contact 360 is connected to the ground contact of the counterpart connector.

The present disclosure described above is not limited to the above-described embodiments and the accompanying drawings, and it will be apparent to those skilled in the art to which the present disclosure belongs that various substitutions, modifications, and changes may be made herein without departing from the scope of the present disclosure.

The invention claimed is:

1. A board connector comprising:

a plurality of radio frequency (RF) contacts through which RF signals are transmitted;

an insulating part configured to support the RF contacts;

a plurality of transmission contacts for transmitting signals other than RF signals, which are coupled to the insulating part between a first RF contact and a second RF contact among the RF contacts such that the first RF contact and the second RF contact are spaced apart from each other in a first axial direction; and a ground housing to which the insulating part is coupled, wherein:

the ground housing includes a ground inner wall facing the insulating part, a ground outer wall spaced apart from the ground inner wall and surrounding the insulating part from an outside thereof, and a ground connection wall coupled to each of the ground inner wall and the ground outer wall, the ground inner wall, the ground outer wall, and the ground connection wall of the ground housing have a seamless continuous surface without any gaps and are integrally formed, the ground inner wall and the ground outer wall form a double block wall that surrounds sides of an inner space therebetween, the first RF contact and the second RF contact are located in the inner space surrounded by the double block wall, the ground housing is disposed to surround the first RF contact and the second RF contact arranged in the inner side space along the first axial direction and a second axial direction perpendicular to the first axial direction, such that the first RF contact and the second RF contact positioned in the inner space are completely shielded by the ground housing along the first axial direction and the second axial direction and are not exposed to the outside in the first axial direction and the second axial direction, and each of the ground inner wall and the ground outer wall is connected to a ground housing of a counterpart connector inserted into the inner space.

2. The board connector of claim 1, wherein the ground housing includes a ground bottom protruding from the ground inner wall toward the inner space, the insulating part includes an insulating member that supports the RF contacts and the transmission contacts, and the ground bottom is located between the ground inner wall and the insulating member.

3. The board connector of claim 2, wherein the insulating part includes an insertion member inserted between the ground inner wall and the ground outer wall, and a connecting member coupled to each of the insertion member and the insulating member, and the ground bottom is disposed to cover the connecting member.

4. The board connector of claim 1, further comprising a first ground contact disposed between the first RF contact and the transmission contacts and coupled to the insulating part, wherein the ground housing includes a first double block wall and a second double block wall which are disposed to face each other in the first axial direction, and a third double block wall and a fourth double block wall which are disposed to face each other in a second axial direction perpendicular to the first axial direction, and the first RF contact is located between the first double block wall and the first ground contact in the first axial direction, and is located between the third double block wall and the fourth double block wall in the second axial direction.

5. The board connector of claim 1, wherein the ground housing includes a connection groove formed in an outer surface of the ground outer wall.

6. The board connector of claim 1, wherein the ground housing includes a conductive member coupled to an outer surface of the ground outer wall, and the conductive member is formed in a closed loop shape so as to extend along the ground outer wall, including a corner portion of the ground outer wall.

7. The board connector of claim 1, wherein the first RF contact includes a first RF mounting member to be mounted on a board and is coupled to the insulating part such that the first RF mounting member is located in a soldering inspection window formed to pass through the insulating part.

8. The board connector of claim 1, wherein the ground outer wall is mounted on a board, and the ground housing is grounded through the ground outer wall mounted on the board.

9. The board connector of claim 1, wherein the ground inner wall includes a first sub-ground inner wall and a second sub-ground inner wall which are disposed to face each other in the first axial direction, and a third sub-ground inner wall and a fourth sub-ground inner wall which are disposed to face each other in a second axial direction perpendicular to the first axial direction, and each of the first sub-ground inner wall, the second sub-ground inner wall, the third sub-ground inner wall, and the fourth sub-ground inner wall is elastically moved based on a portion thereof coupled to the ground connection wall to press the insulating part.

10. A board connector comprising:

a plurality of radio frequency (RF) contacts through which RF signals are transmitted;

an insulating part configured to support the RF contacts;

a plurality of transmission contacts for transmitting signals other than RF signals, which are coupled to the insulating part between a first RF contact and a second RF contact among the RF contacts such that the first RF contact and the second RF contact are spaced apart from each other in a first axial direction; and a ground housing to which the insulating part is coupled, wherein:

the ground housing includes a ground sidewall that surrounds sides of an inner space thereof, a ground bottom that protrudes from a lower end of the ground sidewall toward the inner space, and a ground arm that protrudes upward from the ground bottom, the ground sidewall, the ground bottom of the ground housing have a seamless continuous surface without any gaps and are integrally formed, the first RF contact and the second RF contact are located in the inner space which is surrounded by the ground sidewall and the ground bottom, and wherein the ground housing is disposed to surround the first RF contact and the second RF contact arranged in the inner side space along the first axial direction and a second axial direction perpendicular to the first axial direction, such that the first RF contact and the second RF contact positioned in the inner space are completely shielded by the ground housing along the first axial direction and the second axial direction and are not exposed to an outside in the first axial direction and the second axial direction.

11. The board connector of claim 10, wherein the ground housing includes a ground protrusion that protrudes from an inner surface of the ground arm facing the ground sidewall, and when a counterpart connector is inserted between the ground sidewall and the ground protrusion, the ground arm is elastically moved based on a portion thereof coupled to the ground bottom.

12. The board connector of claim 10, wherein the ground housing includes a coupling member that protrudes upward from the ground bottom, and the coupling member is inserted into the insulating part to couple the ground housing and the insulating part.

13. The board connector of claim 12, wherein the ground housing includes a wedge member that protrudes from the coupling member, and when the coupling member is inserted into the insulating part, the wedge member is stuck in the insulating part to fix the ground housing and the insulating part.

14. The board connector of claim 10, further comprising a first ground contact disposed between the first RF contact and the transmission contacts and coupled to the insulating part, wherein the ground housing includes a first blocking wall and a second blocking wall which are disposed to face each other in the first axial direction, and a third blocking wall and a fourth blocking wall which are disposed to face each other in a second axial direction perpendicular to the first axial direction, the first RF contact is located between the first blocking wall and the first ground contact in the first axial direction, and is located between the third blocking wall and the fourth blocking wall in the second axial direction.

15. The board connector of claim 10, wherein the ground housing includes a connection protrusion that protrudes from an inner surface of the ground sidewall.

16. The board connector of claim 10, wherein the ground housing includes a conductive member coupled to an inner surface of the ground sidewall, and the conductive member is formed in a closed loop shape so as to extend along the inner surface of the ground sidewall, including a corner portion of the inner surface of the ground sidewall.

17. The board connector of claim 10, wherein the first RF contact includes a first RF mounting member to be mounted on a board and is coupled to the insulating part such that the first RF mounting member is located in a soldering inspection window formed to pass through the insulating part.

18. The board connector of claim 10, wherein the ground bottom is mounted on a board, and the ground housing is grounded through the ground bottom mounted on the board.

* * * * *